United States Patent
Axelrod et al.

(10) Patent No.: US 7,219,056 B2
(45) Date of Patent: May 15, 2007

(54) DETERMINING AND USING ACOUSTIC CONFUSABILITY, ACOUSTIC PERPLEXITY AND SYNTHETIC ACOUSTIC WORD ERROR RATE

(75) Inventors: Scott Elliot Axelrod, Mt. Kisco, NY (US); Peder Andreas Olsen, New York, NY (US); Harry William Printz, San Francisco, CA (US); Peter Vincent de Souza, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 09/838,449

(22) Filed: Apr. 19, 2001

(65) Prior Publication Data

US 2002/0032549 A1    Mar. 14, 2002

Related U.S. Application Data

(60) Provisional application No. 60/199,062, filed on Apr. 20, 2000.

(51) Int. Cl.
*G10L 15/00*     (2006.01)
*G06F 7/60*      (2006.01)

(52) U.S. Cl. .................... 704/235; 703/2; 704/236; 704/246; 704/251

(58) Field of Classification Search ............. 703/2; 704/215–256
See application file for complete search history.

(56) References Cited

U.S. PATENT DOCUMENTS

| 4,433,210 | A | * | 2/1984 | Ostrowski et al. .......... 704/265 |
| 4,707,858 | A | * | 11/1987 | Fette ........................ 704/251 |
| 4,817,156 | A | * | 3/1989 | Bahl et al. .................. 704/256 |
| 5,230,037 | A | * | 7/1993 | Giustiniani et al. ......... 704/200 |
| 5,806,029 | A | * | 9/1998 | Buhrke et al. .............. 704/244 |
| 6,073,099 | A | * | 6/2000 | Sabourin et al. ......... 704/256.6 |

(Continued)

OTHER PUBLICATIONS

Gravier et al, "Directory Name Retrieval Using HMM Modeling and Robust Lexical Access", Automatic Speech Recognition and Understanding, 1997. Proceedings., 1997 IEEE Workshop on , Dec. 14-17, 1997 pp. 558-565.*

(Continued)

*Primary Examiner*—Anthony Knight
*Assistant Examiner*—Thomas Stevens
(74) *Attorney, Agent, or Firm*—Ryan, Mason & Lewis, LLP

(57) ABSTRACT

Two statistics are disclosed for determining the quality of language models. These statistics are called acoustic perplexity and the synthetic acoustic word error rate (SAWER), and they depend upon methods for computing the acoustic confusability of words. It is possible to substitute models of acoustic data in place of real acoustic data in order to determine acoustic confusability. An evaluation model is created, a synthesizer model is created, and a matrix is determined from the evaluation and synthesizer models. Each of the evaluation and synthesizer models is a hidden Markov model. Once the matrix is determined, a confusability calculation may be performed. Different methods are used to determine synthetic likelihoods. The confusability may be normalized and smoothed and methods are disclosed that increase the speed of performing the matrix inversion and the confusability calculation. A method for caching and reusing computations for similar words is disclosed. Acoustic perplexity and SAWER are determined and applied.

55 Claims, 9 Drawing Sheets

U.S. PATENT DOCUMENTS

| | | | | |
|---|---|---|---|---|
| 6,185,530 | B1* | 2/2001 | Ittycheriah et al. | 704/255 |
| 6,263,308 | B1* | 7/2001 | Heckerman et al. | 704/231 |
| 6,314,399 | B1* | 11/2001 | Deligne et al. | 704/257 |
| 6,343,270 | B1* | 1/2002 | Bahl et al. | 704/257 |
| 6,366,885 | B1* | 4/2002 | Basu et al. | 704/270 |
| 6,671,668 | B2* | 12/2003 | Harris | 704/246 |
| 6,701,162 | B1* | 3/2004 | Everett | 455/556.1 |
| 6,718,303 | B2* | 4/2004 | Tang et al. | 704/235 |

OTHER PUBLICATIONS

Stolcke, Andreas, "An Efficient Probabilistic Context-free Parsing Algorithm that Computes Prefix Probabilities", Computational Linguistics, vol. 21, Issue 2, Jun. 1995, pp. 165-201.*

Bahl et al, "Constructing Groups of Acoustically Confusable Words", Acoustics, Speech, and Signal Processing, 1990. ICASSP-90, 1990, International Conference on, Apr. 3-6, 1990, pp. 85-88 vol. 1.*

Jelinek, F., "Self-organized Language Modeling for Speech Recognition", Readings in Speech Recognition, p. 474, 1990.*

Bahl et al., "A Maximum Likelihood Approach to Continuous Speech Recognition," IEEE Transactions on Pattern Analysis and Machine Intelligence, vol. PAMI-5, No. 2, pp. 179-190 (Mar. 1983).

Clarkson et al., "The Applicability of Adaptive Language Modelling for the Broadcast News Task," Proceedings of the Fifth International Conference on Spoken Language Processing, Sydney, Australia, p. 2 (Nov. 1998).

Gopalakrishnan et al., "An Inequality for Rational Functions with Applications to Some Statistical Estimation Problems," IEEE Transactions on Information Theory, vol. 37, No. 1, pp. 107-113 (Jan. 1991).

Jelinek, F., "Statistical Methods for Speech Recognition," The MIT Press, Cambridge, MA, Sec. 8.3 re perplexity, p. 2 (1999).

Printz et al., "Theory and Practice of Acoustic Confusability," Proceedings of the ISCA ITRW ASR2000, pp. 77-84 (Sep. 18-20, 2000).

* cited by examiner

FIG. 6

| | $w_1x_1$ | $w_1x_2$ | $w_1x_3$ | $w_2x_1$ | $w_2x_2$ | $w_2x_3$ | $w_3x_1$ | $w_3x_2$ | $w_3x_3$ |
|---|---|---|---|---|---|---|---|---|---|
| $w_1x_1$ | 601 | 0 | 0 | 0 | 0 | 0 | 0 | 0 | 0 |
| $w_1x_2$ | 602 | 603 | 0 | 0 | 0 | 0 | 0 | 0 | 0 |
| $w_1x_3$ | 0 | 604 | 605 | 0 | 0 | 0 | 0 | 0 | 0 |
| $w_2x_1$ | 606 | 0 | 0 | 607 | 0 | 0 | 0 | 0 | 0 |
| $w_2x_2$ | 608 | 609 | 0 | 610 | 611 | 0 | 0 | 0 | 0 |
| $w_2x_3$ | 0 | 612 | 613 | 0 | 614 | 615 | 0 | 0 | 0 |
| $w_3x_1$ | 0 | 0 | 0 | 616 | 0 | 0 | 617 | 0 | 0 |
| $w_3x_2$ | 0 | 0 | 0 | 618 | 619 | 0 | 620 | 621 | 0 |
| $w_3x_3$ | 0 | 0 | 0 | 0 | 622 | 623 | 0 | 624 | 625 |

FIG. 9

| | $w_1x_1$ | $w_1x_2$ | $w_1x_3$ | $w_2x_1$ | $w_2x_2$ | $w_2x_3$ | $w_3x_1$ | $w_3x_2$ | $w_3x_3$ | $w_4x_1$ | $w_4x_2$ | $w_4x_3$ | |
|---|---|---|---|---|---|---|---|---|---|---|---|---|---|
| $w_1x_1$ | 601 | 0 | 0 | 0 | 0 | 0 | 0 | 0 | 0 | 0 | 0 | 0 | $r_1$ |
| $w_1x_2$ | 602 | 603 | 0 | 0 | 0 | 0 | 0 | 0 | 0 | 0 | 0 | 0 | $r_2$ |
| $w_1x_3$ | 0 | 604 | 605 | 0 | 0 | 0 | 0 | 0 | 0 | 0 | 0 | 0 | $r_3$ |
| $w_2x_1$ | 606 | 0 | 0 | 607 | 0 | 0 | 0 | 0 | 0 | 0 | 0 | 0 | $r_4$ |
| $w_2x_2$ | 608 | 609 | 0 | 610 | 611 | 0 | 0 | 0 | 0 | 0 | 0 | 0 | $r_5$ |
| $w_2x_3$ | 0 | 612 | 613 | 0 | 614 | 615 | 0 | 0 | 0 | 0 | 0 | 0 | $r_6$ |
| $w_3x_1$ | 0 | 0 | 0 | 616 | 0 | 0 | 617 | 0 | 0 | 0 | 0 | 0 | $r_7$ |
| $w_3x_2$ | 0 | 0 | 0 | 618 | 619 | 0 | 620 | 621 | 0 | 0 | 0 | 0 | $r_8$ |
| $w_3x_3$ | 0 | 0 | 0 | 0 | 622 | 623 | 0 | 624 | 625 | 0 | 0 | 0 | $r_9$ |
| $w_4x_1$ | 0 | 0 | 0 | 0 | 0 | 0 | 901 | 0 | 0 | 902 | 0 | 0 | $r_9$ |
| $w_4x_2$ | 0 | 0 | 0 | 0 | 0 | 0 | 903 | 904 | 0 | 905 | 906 | 0 | $r_{11}$ |
| $w_4x_3$ | 0 | 0 | 0 | 0 | 0 | 0 | 0 | 907 | 908 | 0 | 909 | 910 | $r_{12}$ |

DETERMINING AND USING ACOUSTIC CONFUSABILITY, ACOUSTIC PERPLEXITY AND SYNTHETIC ACOUSTIC WORD ERROR RATE

CROSS REFERENCE TO RELATED APPLICATIONS

This application claims the benefit of U.S. Provisional Application No. 60/199,062, filed Apr. 20, 2000.

FIELD OF THE INVENTION

The present invention relates to speech recognition systems and, more particularly, to the definition and efficient computation of the numerical quantities called acoustic confusability, acoustic perplexity, and synthetic word error rate, used in the creation and operation of speech recognition systems.

BACKGROUND OF THE INVENTION

In the operation of a speech recognition system, some acoustic information is acquired, and the system determines a word or word sequence that corresponds to the acoustic information. The acoustic information is generally some representation of a speech signal, such as the variations in voltage generated by a microphone. The output of the system is the best guess that the system has of the text corresponding to the given utterance, according to its principles of operation.

The principles applied to determine the best guess are those of probability theory. Specifically, the system produces as output the most likely word or word sequence corresponding to the given acoustic signal. Here, "most likely" is determined relative to two probability models embedded in the system: an acoustic model and a language model. Thus, if A represents the acoustic information acquired by the system, and W represents a guess at the word sequence corresponding to this acoustic information, then the system's best guess W* at the true word sequence is given by the solution of the following equation:

$$W^* = \mathrm{argmax}_W P(A|W)P(W).$$

Here P(A|R) is a number determined by the acoustic model for the system, and P(W) is a number determined by the language model for the system. A general discussion of the nature of acoustic models and language models can be found in "Statistical Methods for Speech Recognition," Jelinek, The MIT Press, Cambridge, Mass. 1999, the disclosure of which is incorporated herein by reference. This general approach to speech recognition is discussed in the paper by Bahl et al., "A Maximum Likelihood Approach to Continuous Speech Recognition," IEEE Transactions on Pattern Analysis and Machine Intelligence, Volume PAMI-5, pp. 179–190, March 1983, the disclosure of which is incorporated herein by reference.

The acoustic and language models play a central role in the operation of a speech recognition system: the higher the quality of each model, the more accurate the recognition system. A frequently-used measure of quality of a language model is a statistic known as the perplexity, as discussed in section 8.3 of Jelinek. For clarity, this statistic will hereafter be referred to as "lexical perplexity." It is a general operating assumption within the field that the lower the value of the lexical perplexity, on a given fixed test corpus of words, the better the quality of the language model.

However, experience shows that lexical perplexity can decrease while errors in decoding words increase. For instance, see Clarkson et al., "The Applicability of Adaptive Language Modeling for the Broadcast News Task," Proceedings of the Fifth International Conference on Spoken Language Processing, Sydney, Australia, November 1998, the disclosure of which is incorporated herein by reference. Thus, lexical perplexity is actually a poor indicator of language model effectiveness.

Nevertheless, lexical perplexity continues to be used as the objective function for the training of language models, when such models are determined by varying the values of sets of adjustable parameters. What is needed is a better statistic for measuring the quality of language models, and hence for use as the objective function during training.

SUMMARY OF THE INVENTION

The present invention solves these problems by providing two statistics that are better than lexical perplexity for determining the quality of language models. These statistics, called acoustic perplexity and the synthetic acoustic word error rate (SAWER), in turn depend upon methods for computing the acoustic confusability of words. Some methods and apparatuses disclosed herein substitute models of acoustic data in place of real acoustic data in order to determine confusability.

In a first aspect of the invention, two word pronunciations l(w) and l(x) are chosen from all pronunciations of all words in fixed vocabulary V of the speech recognition system. It is the confusability of these pronunciations that is desired. To do so, an evaluation model (also called valuation model) of l(x) is created, a synthesizer model of l(x) is created, and a matrix is determined from the evaluation and synthesizer models. Each of the evaluation and synthesizer models is preferably a hidden Markov model. The synthesizer model preferably replaces real acoustic data. Once the matrix is determined, a confusability calculation may be performed. This confusability calculation is preferably performed by reducing an infinite series of multiplications and additions to a finite matrix inversion calculation. In this manner, an exact confusability calculation may be determined for the evaluation and synthesizer models.

In additional aspects of the invention, different methods are used to determine certain numerical quantities, defined below, called synthetic likelihoods. In other aspects of the invention, (i) the confusability may be normalized and smoothed to better deal with very small probabilities and the sharpness of the distribution, and (ii) methods are disclosed that increase the speed of performing the matrix inversion and the confusability calculation. Moreover, a method for caching and reusing computations for similar words is disclosed.

Still more aspects of the invention determine and apply acoustic perplexity and the synthetic acoustic word error rate (SAWER). Acoustic perplexity and SAWER are better determinants of the effectiveness of language models than is lexical perplexity.

A more complete understanding of the present invention, as well as further features and advantages of the present invention, will be obtained by reference to the following detailed description and drawings.

BRIEF DESCRIPTION OF THE DRAWINGS

FIG. 6 shows a probability flow matrix determined from the product machines of FIGS. 4 and 5, in accordance with one embodiment of the present invention;

FIG. 9 shows a matrix determined from the product machine of FIG. 8 in accordance with one embodiment of the present invention.

DETAILED DESCRIPTION OF PREFERRED EMBODIMENTS

Figure 1:
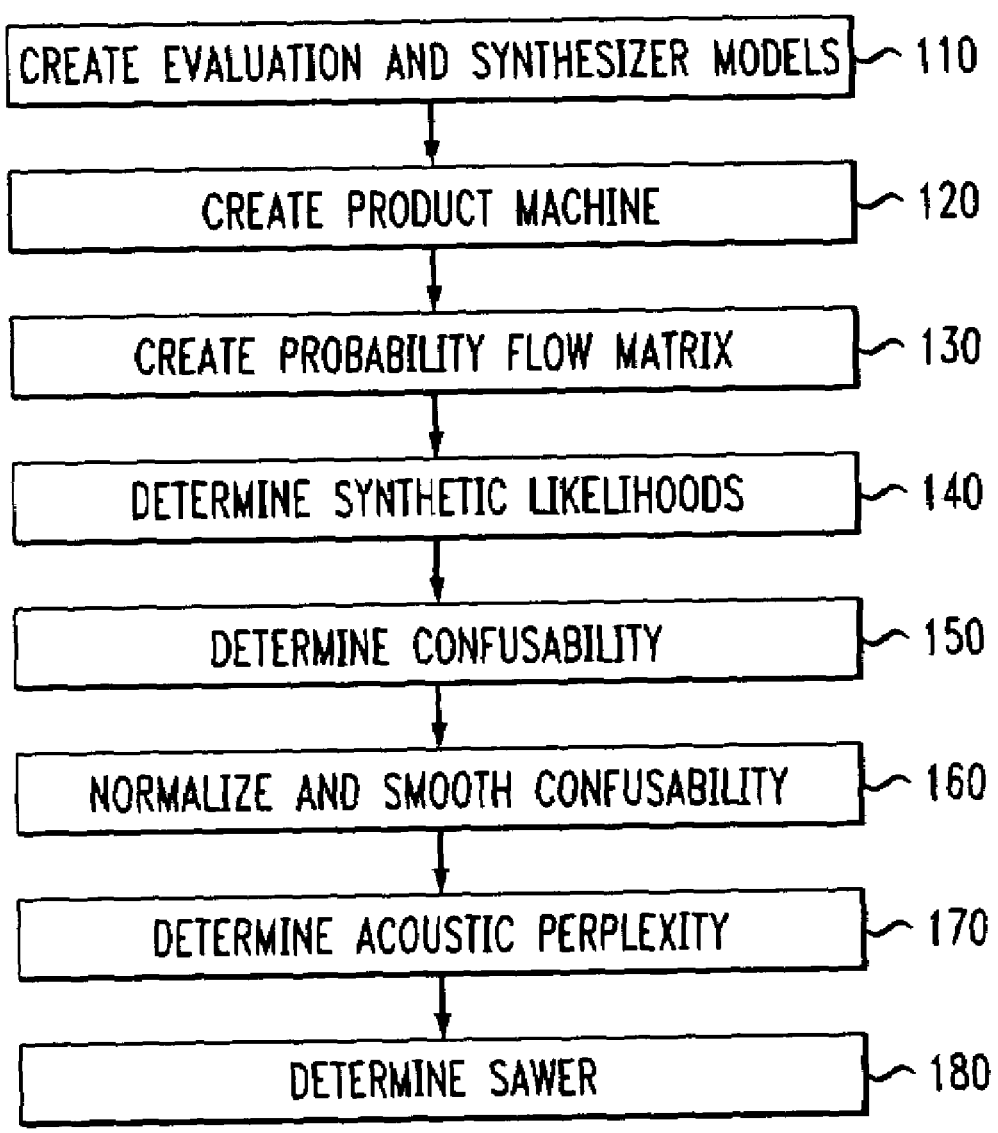
FIG. 1 is a flow chart describing an exemplary process that determines and uses confusability, in accordance with one embodiment of the present invention.

The present invention provides two statistics that are better than lexical perplexity for determining the quality of language models. These statistics, called acoustic perplexity and the synthetic acoustic word error rate (SAWER), in turn depend upon methods for computing the acoustic confusability of words. There are multiple methods for computing acoustic confusability, but two particular methods will be discussed herein. In one method of determining confusability, a model of acoustic data is substituted in place of real acoustic data in order to determine confusability. In another method, the edit distance between phoneme sequences is used to determine confusability. Confusability as determined by the first method depends on terms entitled "synthetic likelihoods," and several different techniques are disclosed herein that determine these likelihoods.

Acoustic perplexity and SAWER have multiple applications. Importantly, these may be applied to determine the quality of language models and during language model generation to improve language models.

(1) Organization

This disclosure is arranged as follows. In Section (2), a short introduction to a method for determining and using confusability is given. In Section (3), acoustic perplexity is introduced. This is related and compared to the concept of lexical perplexity, which statistic the present invention supersedes. In section (3)(a), it is shown how acoustic perplexity may be determined, in a way analogous to lexical perplexity. How the language model probabilities enter into the definition of acoustic perplexity is also shown. A quantity known as the acoustic encoding probability is defined, which is used in determining acoustic perplexity.

In section (3)(b), the computation of acoustic encoding probability is developed. This development proceeds through sections (3)(c) through (3)(f), which sections also relate the acoustic encoding probability to acoustic confusability. In section (3)(c), the concept of multiple lexemes or pronunciations is discussed. Next, also in section (3)(c), the modeling of sequences of real acoustic observations is discussed, followed by a discussion of replacement of real observations with synthetic observations.

In section (3)(d), the development of a method for computing acoustic confusability between models is begun; in this section, confusability of densities is also discussed. This development proceeds by the following steps. In section (3)(e), the interaction between paths and densities is shown and discussed. In section (3)(f), an algorithm for computing confusability of hidden Markov models is disclosed. This method, as shown in section (3)(f), comprises the following: (i) constructing a product machine; (ii) defining the transition probabilities and synthetic likelihoods of the arcs and states of this product machine; and (iii) determining a probability flow matrix and relating the result of a certain matrix computation to acoustic confusability.

In section (4), the disclosure returns to the definition of acoustic perplexity. Next, in section (5), SAWER is disclosed. The methods of section (3) are expanded to multiple lexemes (section (6)) and continuous speech (section (7)). Section (8) discusses using acoustic perplexity and SAWER during training of language models. This section also discusses minimization of acoustic perplexity and SAWER, and discloses additional computational refinements.

Section (9) discloses general computational enhancements when determining acoustic confusability. In section (9)(a), it is shown how the matrix computation, performed when determining confusability, may be performed efficiently. Section (9)(b) discusses additional efficiencies by caching, while section (9)(c) discusses thresholding.

Section (10) discloses additional applications of acoustic perplexity and SAWER. In section (10)(a), a method of vocabulary selection is disclosed. Section (10)(b) explains selection of trigrams and maxent model features. Section (11) explains alternative, approximate techniques to compute confusability, which are based on edit distances between phoneme sequences. Finally, section (12) discusses an exemplary system for carrying out embodiments of the present invention.

(2) Exemplary Method for Determining Confusability, Acoustic Perplexity and Sawer Now that the organization of this disclosure has been discussed, it is beneficial to present a simple method for determining and using acoustic confusability (or, more simply, "confusability"). FIG. 1 shows a flow chart of an exemplary method 100 for determining confuisability, acoustic perplexity, and SAWER. Method 100 illustrates one particular technique used to determine confusability. Because the determination of confusability, acoustic perplexity and SAWER is mathematically complex for those not skilled in the art, FIG. 1 is introduced at this point to give an overview of method 100. Each step in method 100 is described below in more detail.

Method 100 begins when evaluation and synthesizer models are created in step 110. As is known in the art and discussed in greater detail below, hidden Markov models are used to statistically model acoustic pronunciations of words. The exemplary evaluation and synthesizer models are therefore hidden Markov models.

In step 120, a product machine is created from the evaluation and synthesizer models. This is explained in greater detail below. The product machine is used to create a probability flow matrix (step 130). Entries of the probability flow matrix depend on synthetic likelihoods, which are determined in step 140. After entries of the probability flow matrix have been determined, confusability is determined (step 150). Actual confusability values can be very small values. Consequently, the confusability is normalized.

Additionally, the confusability is smoothed to correct for resultant probabilities that are too sharp. Normalization and smoothing occur in step 160.

Once the confusability has been determined, smoothed, and normalized, the acoustic perplexity and/or SAWER may be determined in steps 170 and 180, respectively. Both acoustic perplexity and SAWER are superior to lexical perplexity as predictors of language model performance. Thus determination of these quantities, and using them as objective functions when adjusting language model parameters, improves language model generation.

It is beneficial at this juncture to start with a description of some basic equations that concern speech recognition. Moreover, it is also beneficial to relate confusability with acoustic perplexity, as one application of confusability is that it is used to determine acoustic perplexity. The following technique applies to full words, and context may also be taken into account. Here "context" means that the details of pronunciation of each of the words or phrases whose confusability is being computed depends in some way on one or more adjacent words. However, some simplifications help make the following method more understandable. These simplifications assume that each of the evaluation and synthesizer models comprises one word that is a single phoneme long, and context is ignored. These simplifications are used to make the drawings easier to understand, but the method itself is applicable to large words and/or phrases, and to cases where context is taken into account, in the sense given above.

(3) Confusability

Let $P_\theta$ be a language model, where $P_\theta(w_0 \ldots w_s)$ is the probability that the model assigns to word sequence $w_0 \ldots w_s$, and $\theta$ is a (typically very large) set of parameters, which determines the numerical value of this probability. One widely-used method of assigning values to the elements of $\theta$ is to obtain a corpus C equal to $w_0 \ldots w_N$ of naturally generated text, also very large, and to adjust $\theta$ to maximize $P_\theta(C)$, the modeled probability of the corpus. This is an instance of the well-established principle of maximum-likelihood estimation. The model is made to accord as closely as possible with a collection of examples, in hopes that it will function well as a predictor in the future. More formally, the adjustable parameters of the model are set to values that maximize its assignment of probability to instances of the phenomenon being modeled. Within the speech recognition field, this adjusting process is commonly called "training."

Since the aim of modeling is to assign high probability to events that are known to occur, while assigning little or no probability to those that do not, this approach is reasonable. But this approach leads to the assumption that the higher the value $P_\theta(C)$ attains, or possibly the same statistic $P_\theta(T)$, computed on an independent test corpus T, the better the model must be. Because the quantity $$Y_L(P_\theta, C) = P_\theta(C)^{-1/|C|}, \tag{1}$$

called the perplexity (and herein called the lexical perplexity), is inversely related to the raw likelihood $P_\theta(C)$, the assumption has arisen that the lower the perplexity, the better. Perplexity is commonly reported in papers on language modeling. However, it is known from experience that lexical perplexity is a poor indicator of the performance of a language model. For instance, it can be shown that, as lexical perplexity decreases, the error rate of decoding can actually increase.

(3)(a) Acoustic Perplexity

As an analog of lexical perplexity, the quantity $$Y_A(P_\theta, C, A) = P_\theta(C|A)^{-1/|C|}, \tag{2}$$

is defined as the acoustic perplexity of the model $P_\theta$, evaluated on lexical corpus C and its acoustic realization A. In the same way as $P_\theta$ is decomposed into a product of individual-word probabilities, for use in computing $Y_L$, so too may $P_\theta(C|A)$ be decomposed.

To express this decomposition, the following notational conventions are adopted. The word that is being decoded, at the current position i of a textual corpus, is $w_i$. Its acoustic realization, which is the sound of someone speaking this word, is written $\alpha(w_i)$. The sequence of all words preceding $w_i$, which is $w_0, w_1, \ldots, w_{i-1}$, is denoted $h_i$; and its acoustic realization is $\alpha(h_i)$. Likewise, the sequence of all words following $w_i$ is written $r_i$, with acoustics denoted $\alpha(r_i)$. Here, the letter r is used to suggest "right context," meaning the words occurring in the future. In general, "$h_i$" is a series of words that occurs in the past, "$w_i$" is a word that occurs in the present (at time i), and "$r_i$" is a series of words that occurs in the future.

Figure 2:
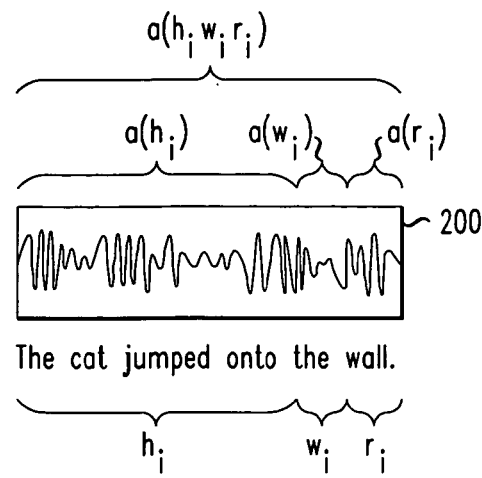
FIG. 2 is a diagram of an exemplary speech portion.

Referring to FIG. 2, a representation 200 of an acoustic event is shown. Representation 200 illustrates the notational conventions discussed in the preceding paragraph. The acoustic event is someone saying the phrase "The cat jumped onto the wall." Representation 200 is an exemplary analog signal of the acoustic event that is obtained, for instance, with a microphone. In the sentence, "The cat jumped onto the wall," the $h_i$ represents "The cat jumped onto" and any other preceding words, $w_i$ represents "the," and $r_i$ represents "wall" and any other subsequent words. In this context, $h_i$, $w_i$, and $r_i$ represent the words being spoken as abstract linguistic tokens. The variable $\alpha(h_i\ w_i\ r_i)$ represents the acoustics of those words. In other words, $\alpha(h_i\ w_i\ r_i)$ represents how a person actually says the sentence, "The cat jumped onto the wall." Similarly, acoustics $\alpha(h_i)$ represents a person saying "The cat jumped onto;" acoustics $\alpha(w_i)$ represents a person saying "the;" and acoustics $\alpha(r_i)$ represents a person saying "wall." Note that $h_i$ is the word history at position i, and comprises all words up to but not including the current word $w_i$.

Generally, the acoustic event $\alpha(w_i)$ is a radially expanding pressure wave, emanating from the mouth of a speaker when the word $w_i$ is pronounced. The pressure wave is transduced to an analog electrical signal (shown as representation 200), which is then quantized in time and amplitude. The electrical signal is ultimately processed into a finite sequence $<\bar{\alpha}_w^0 \ldots \bar{\alpha}_s^{T-1}>$, also written $<\bar{\alpha}_w^i>$, where i is understood to run from i=0 to some limit T−1, of d-dimensional feature vectors. The list $<\bar{\alpha}_w^i>$ constitutes the observation sequence. More specifically, most speech recognition systems operate as follows. The sequence of time- and amplitude-quantized samples is separated into a series of overlapping blocks of samples. Each block, which is also called a frame, is then processed by well-known techniques to yield a cepstral vector. Typically a new cepstral vector is generated every 10 milliseconds (ms); many systems use a cepstral vector of 13 dimensions. The first and second differences of these cepstral vectors are then typically concatenated to each original 13 dimensional vector, yielding a series of 39 dimensional vectors. For such a system, the variable d mentioned above attains the value 39. Therefore, each 10 ms, another feature vector having 39 dimensions will be created. The acoustic event $\alpha(w)$ constitutes a contiguous sequence of these d-dimensional feature vectors. A speech recognition system attempts to analyze these feature vectors and, from them, determine the word w. In the notation just given, $<\overline{\alpha}_w'22$ is precisely this sequence of contiguous feature vectors.

By elementary probability theory, the decomposition of $P_\theta(C)$ may be expressed as follows:

$$P_\theta(C) = P_\theta(w_0 w_1 \ldots w_{|C|-1}) = \prod_{i \in C} p_\theta(w_i | h_i). \quad (3)$$

For this reason, $P_\theta$ is identified with the family of conditional distributions $\{p_\theta(w|h)\}$ that underlies it. The family $\{p_\theta(w|h)\}$, and the general model $P_\theta$ are spoken of interchangeably in the singular as "a language model."

Applying this to the decomposition of $P_\theta(C|A)$, one may write $C=w_0 w_1 \ldots w_{|C|-1}$ and $A=\alpha(w_0 w_1 \ldots w_{|C|-1})$. By the rules of conditional probability, it follows that:

$$P_\theta(C | A) = \prod_{i \in C} p_\theta(w_i | h_i a(w_0 w_1 \ldots w_{|C|-1})) \quad (4)$$

$$= \prod_{i \in C} p_\theta(w_i | h_i a(h_i w_i r_i)), \quad (5)$$

where the second line is a purely notational variant of the first. (This is so because even as i varies, $\alpha(h_i w_i r_i)$ continues to denote the entire acoustic signal.) This expression is appropriate for recognition of continuous speech. For recognition of discrete speech, where each word is unmistakably surrounded by silence, the simpler form shown below occurs:

$$P_\theta(C | A) = \prod_{i \in C} p_\theta(w_i | h_i a(w_i)). \quad (6)$$

Next, how the language model probability enters explicitly into this expression is shown. Consider any one factor in equation (5). Suppressing the i subscript for readability, by Bayes theorem it may be written:

$$p_\theta(w | ha(hwr)) = \frac{p(a(hwr) | wh) p_\theta(w | h)}{\sum_{x \in V} p(a(hwr) | xh) p_\theta(x | h)}, \quad (7)$$

where V is the vocabulary of all words recognized by the speech recognition system. Here $p_\theta(w|h)$ and $p_\theta(x|h)$ are regular language model probabilities. For the case of discrete speech, this expression takes the form:

$$p_\theta(w | ha(w)) = \frac{p(a(w) | wh) p_\theta(w | h)}{\sum_{x \in V} p(a(w) | xh) p_\theta(x | h)}. \quad (8)$$

This disclosure will refer to the family of conditional distributions $\{p(\alpha(h\ w\ r)|x\ h)\}$, which arises in the continuous case, or the family $\{p(\alpha(w)|x\ h)\}$, which arises in the discrete case, as an acoustic encoding model. An individual value $p(\alpha(h\ w\ r)|x\ h)$ in the continuous case, or $p(\alpha(w)|x\ h)$ in the discrete case, is called an acoustic encoding probability (or, more precisely, the acoustic encoding probability of x as $\alpha(h\ w\ r)$ or $\alpha(w)$ in context h). The ordering of conditioning information as x h or h x is immaterial here, and we will interchange them freely.

Thus, the acoustic encoding probability should be computed to determine acoustic perplexity. Under appropriate assumptions, the continuous-case acoustic encoding probability may be approximated as:

$$p(\alpha(h\ w\ r)|h\ x) \approx p(\alpha(h)|h)\ p(\alpha(w)|h\ x)\ p(\alpha(r)|h). \quad (9)$$

Several assumptions were made to simplify the acoustic encoding probability as shown in equation (9). First, it was assumed that $\alpha(h\ w\ r)=\alpha(h)\alpha(w)\alpha(r)$. This assumes independence of these acoustic events. In reality, these will generally not be independent, as the tongue and other vocal equipment do not change instantaneously to be able to transition from one word to the next. Second, this also assumes that $\alpha(h)$ and $\alpha(r)$ do not depend on the word x.

Thus, under these assumptions, the value $p(\alpha(w)|h\ x)$ is now the quantity that needs to be determined, in either the continuous or discrete cases. This disclosure will treat the continuous case in more detail later.

(3)(b) Computing Acoustic Encoding Probability

Thus, the aim is to provide a working definition of an acoustic encoding probability, in the discrete case written $p(\alpha(w)|h\ x)$. The term $p(\alpha(w)|h\ x)$ is defined herein as the acoustic confusability of w with respect to x. For simplicity, the context h may be ignored for the moment and just $p(\alpha(w)|x)$ considered. Here $\alpha(w)$ is an acoustic event, which is to say a signal that exists in the physical world. By comparison x is an element of an abstract space of words, drawn from a finite set V, the vocabulary. This x is just a placeholder, to determine which model to use when computing $p(\alpha(w)|x)$. Note that $p(\alpha(w)|x)$ is nominally the probability of observing acoustic signal $\alpha(w)$, given that x was the word actually being pronounced.

(3)(c) Lexemes and Replacement of Real Acoustic Observations with Synthetic Acoustic Observations If there were only one single model $p(\cdot|x)$ for word x (that is, one single model for evaluating acoustic event probabilities, on the assumption that x was the word being pronounced), then $p(\alpha(w)|x)$ would be the probability that this model assigns to the observation $\alpha(w)$. But, in general, a given word x has many pronunciations. For instance, the word "the" may be pronounced "TH UH" or "TH IY," wherein the "TH," "UH," "TH," and "IY" are phonemes (also called "phones"). Phonemes are small, indivisible acoustic elements of speech; here UH represents a schwa sound, whereas IY represents a long e vowel. There are about 51 phonemes in English, although some speech recognition systems might have more or less phonemes. These pronunciations are referred to as lexemes or baseforms, and the following may be written:

$$x=\{l^1(x), l^2(x), \ldots, l^{n_x}(x)\}, \quad (10)$$

to indicate that a word x admits of multiple pronunciations $l^1$, $l^2(x)$ and so on. Here $n_x$ is the number of distinct pronunciations recognized for x and each $l^i(x)$ is one lexeme. Carrying this notation a little further, it is possible to write $l(x) \in x$ for an arbitrary lexeme $l(x)$ associated with the word x, and $\Sigma_{l(x) \in x}$ for a sum in which $l(x)$ varies over the lexeme set for x.

Using these known pronunciations, Equation 9 becomes:

$$p(a(w) | hx) \approx \sum_{l(x) \in x} p(a(w) | hxl(x)) p(l(x) | hx). \quad (11)$$

In this equation, each pronunciation l(x) is a sequence of phones. The quantity $p(\alpha(w)|h \times l(x))$ is the probability of observing the acoustic signal $\alpha(w)$, given the history/context h, the word x, and the pronunciation of the word x as l(x). Since the pronunciation l(x) is uniquely associated with word x, listing x as part of the conditioning information as well is unnecessary. Thus, the quantity $p(\alpha(w)|h \times l(x))$ may be written $p(\alpha(w)|l(x))$ with no loss of generality.

It is assumed that the model $p(\cdot|l(x)\ h)$ is a continuous-density hidden Markov model. Hidden Markov models are described in Jelinek, "Statistical Methods for Speech Recognition," The MIT Press, Cambridge, Mass., 1997, the disclosure of which is incorporated herein by reference. Such a hidden Markov model consists of a set of states Q with identified initial and final states, a probability density function $\delta_{qq'}$ for each allowed state-to-state transition, and a matrix $\tau$ of transition possibilities. The likelihood of a sequence of observations $p(<\bar{\alpha}_w^l>|l(x)\ h)$ is then taken as the sum over all paths from the initial to final state of the joint probability of a given path and the associated sequence of observation probabilities. Since such a model serves to evaluate the likelihood of an observation sequence, it is referred to as an evaluation model.

This likelihood would be the number sought if a joint corpus <C,A> (the corpus of words that have equivalent acoustic events associated with them) was sufficiently large. With a large enough joint corpus, one could simply determine from the joint corpus the likelihood of any observation sequence, on the assumption that each word of the vocabulary was pronounced a very large number of times. However, the typical joint corpus<C,A> is very small as compared to a regular language model corpus. For instance, a large joint corpus is generally 1000 times smaller than a typical language model corpus. Moreover, the sequence < $\bar{\alpha}_w^l>$ constitutes one single pronunciation of the word w. This could be the sole instance, or one of the few instances, of the word in the entire corpus. It would be misleading, when estimating word confusabilities, to rely upon so little data. What would be ideal is a large number of such instances of pronunciations, all pronounced in the same context h, but also comprising a large number of distinct contexts. Unfortunately, no such acoustic corpus exists.

For this reason, the strategy of synthesizing observation sequences corresponding to $\alpha(w)$ is adopted. To synthesize observation sequences, the same type of model is employed to evaluate the likelihood of an observation sequence is used as a generative model for $\alpha(w)$. However, this model operates with its own densities and transition probabilities to generate data points. Though it preferably has exactly the same form as an evaluation model, this model will be referred to as a synthesizer model. The synthesizer and evaluation models are described in more detail in reference to FIG. 6.

Thus, a true acoustic realization $\alpha(w)$ is replaced by a model $\hat{\alpha}(w)$. Therefore, $p(\alpha(w)|h\ l(x))$ becomes $$p(\alpha(w)|h\ l(x)) \approx p(\hat{\alpha}(w)|h\ l(x)). \quad (12)$$

There are some additional assumptions that may be made to simplify Equation 12. While these assumptions are not necessary, they do act as an aid to understanding the invention. Some exemplary assumptions are as follows. If the word w is assumed to have only one pronunciation and both the word w and the word x are considered to consist of only one phone, simple models will result for each of the synthesizer and evaluation models. (Arbitrarily long words or phrases may be treated by this method, simply by stringing together individual phone models, one after the other.) These simple models are shown in more detail in FIG. 3. Mathematically, for the phone W, which is a representation of $\hat{\alpha}(w)$ and the phone X, which is a representation of l(x), and if context h is ignored, Equation 12 becomes:

$$p(\hat{\alpha}(w)|h\ l(x)) \approx p(W|X). \quad (13)$$

Methods for estimating the right hand side of equation 13 are discussed below. One method involves determining a probability flow matrix and using the probability flow matrix to determine acoustic confusability. Prior to determining the elements of the probability flow matrix, synthetic likelihoods are determined. Synthetic likelihoods are measures of how confuisable two given densities are. More specifically, synthetic likelihoods are measures of the similarity or confusability of two specific output or observation densities associated with two hidden Markov models. There are various methods for determining synthetic likelihoods, which are described below.

(3)(d) Confusability of Densities

Synthetic likelihoods arise from the problem of synthesizing data according to one probability density and evaluating it according to another. The following four techniques to determine synthetic likelihoods are discussed herein: the cross-entropy measure; the dominance measure; the decoder measure; and the empirical measure. Each of these may be compressed through the techniques of compression by normalization or compression by ranks. The compressed synthetic likelihoods are the $\kappa$ values that appear throughout the drawings and that will most likely be used in the definitions of acoustic confusability, acoustic perplexity, and synthetic acoustic word error rate.

(3)(d)(1) The Cross-Entropy Measure

First, consider a radically simplified version of this computation. Suppose that for every acoustic event $\alpha(w)$, the associated sequence $<\bar{\alpha}_w^l>$ has length 1, and that the dimension d of this single vector is also 1. In other words, $\alpha(w)$ is identified with a single real number $a_w$. Likewise, suppose that the valuation model $p(\cdot|l(x)\ h)$ has a single transition, with associated density $\delta_{l(x)h}$, hereafter abbreviated $\delta_x$. Hence, if $\alpha_w = \{\alpha_w^1 \ldots \alpha_w^N\}$ is a corpus of one-dimensional, length-1 observation vectors corresponding to N true independent pronounced instances of word w, then the likelihood of these observations according to the valuation model is $$L(A_w|\delta_x) = \delta_x(\alpha_w^1) \ldots \delta_x(\alpha_w^N). \quad (14)$$

The following discussion relates how to replace true observations with synthetic ones. Assume for a moment that word w has a single pronunciation l(w), and consider a synthesized observation corpus $\hat{A}_w = \{\hat{\alpha}_w^1 \ldots \hat{\alpha}_w^N\}$, where the elements are independent and identically distributed (iid) random variables, distributed according to density $\delta_{l(w)h}(\cdot)$, hereafter abbreviated $\delta_w$. Fix some finite interval [−r, r], and assume that it is divided into N subintervals $J_i = [v_i, v_i + \Delta v]$, where $v_i = -r + i\ \Delta v$ and $\Delta v = 2r/N$, where i runs from 0 to N−1. The expected number of elements of $\hat{A}_w$ falling into $J_i$ is therefore $\delta_w(v_i) \cdot \Delta v \cdot N$. The synthetic likelihood of this sequence is defined as $$L_{rN}(\hat{A}_w | \delta_x) = \prod_{i=0}^{N-1} \delta_x(v_i)^{\delta_w(v_i) \Delta v \cdot N}. \quad (15)$$

Hence, the per-event synthetic log likelihood is $$S_{rN}(\hat{A}_w | \delta_x) = \frac{1}{N} \log L_{rN}(\hat{A}_w | \delta_x) = \sum_{i=0}^{N-1} \delta_w(v_i) \cdot \log \delta_x(v_i) \Delta v. \quad (16)$$

This is a Riemann-Stieltjes sum. At this point, assume that $\delta_w$ and $\delta_x$ are both mixtures of Gaussians. (Any other form of density may also be used, providing the integrals (17) and (18) below exist. The assumption that the densities are mixtures of Gaussians is made only to ensure this.) Then the integrand $\delta_w(v) \cdot \log \delta_x(v)$ is continuous on the compact set $[-r, r]$, since $\delta_x(v)$ is bounded uniformly away from 0 on this interval, and so the limit $$S_{rN}(\hat{A}_w | \delta_x) = \lim_{n \to \infty} S_{rN}(\hat{A}_w | \delta_x) = \int_{-r}^{r} \delta_w(v) \log \delta_x(v) dv \quad (17)$$

exists (as both a Riemann and Lebesgue integral). Taking the limit as $r \to \infty$, define $$\rho(\delta_w | \delta_x) = \int \delta_w \log \delta_x, \quad (18)$$

as the synthetic log likelihood of $\delta_w$ given $\delta_x$. Exponentiating this quantity, it is possible to define $$\kappa^I(\delta_w | \delta_x) = \exp \rho(\delta_w | \delta_x), \quad (19)$$

as the synthetic likelihood of $\delta_w$ given $\delta_x$. This quantity will be treated as if it were a true likelihood. This substitution of synthetic for true likelihoods essentially uses synthesized data to compensate for a corpus that contains inadequate examples of actual pronunciations.

(3)(d)(1)(A) Compression by Normalization

The synthetic likelihoods have a very large dynamic range. The synthetic likelihoods can vary anywhere between about $10^{-300}$ to $10^{-0}$. Because of this, it is beneficial to compress the range.

One technique for compressing the synthetic likelihoods is to normalize them. Defining $\Delta$ as the set $\{\delta(\cdot)\}$ that appear in a speech recognition system, then $$\kappa(\delta_w | \delta_x) = \frac{1}{Z(\delta_x)} \kappa'(\delta_w | \delta_x), \quad (20)$$

where $$Z(\delta_x) = \sum_{\delta_w \in \Delta} \kappa'(\delta_w | \delta_x). \quad (21)$$

Thus, Equations 20 and 21 compress the synthetic likelihoods through normalization.

(3)(d)(1)(B) Compression by Ranking

Another technique to compress the synthetic likelihoods is through ranking. In compression by ranking, each $\kappa^I(\delta_w | \delta_x)$ in the synthetic likelihood set $\{\kappa^I(\delta_{w_1} | \delta_x), \kappa^I(\delta_{w_2} | \delta_x), \ldots, \kappa^I(\delta_{w_{|\Delta|}} | \delta_x)\}$ is ranked by value from largest to smallest. The resultant set is $\{\kappa^I(\delta_{s_1} | \delta_x), \kappa^I(\delta_{s_2} | \delta_x), \ldots, \kappa^I(\delta_{s_{|\Delta|}} | \delta_x)\}$, where s stands for "swapped," and $\kappa^I(\delta_{s_1} | \delta_x)$ is the largest $\kappa^I(\delta_w | \delta_x)$ in the synthetic likelihood set, while $\kappa^I(\delta_{s_{|\Delta|}} | \delta_x)$ is the smallest $\kappa^I(\delta_w | \delta_x)$ in the synthetic likelihood set. The resultant set, $\{\kappa^I(\delta_{s_1} | \delta_x), \kappa^I(\delta_{s_2} | \delta_x), \ldots, \kappa^I(\delta_{s_{|\Delta|}} | \delta_x)\}$, is paired with a known predetermined set of probabilities, $\{p_1, p_2, \ldots, p_{|\Delta|}\}$. To determine the final synthetic likelihood, $\kappa$, one replaces the value $\kappa^I(\delta_{s_j} | \delta_x)$ with the jth element of the predetermined set of probabilities. The value so obtained is used as $\kappa$ for the particular $\kappa^I(\delta_w | \delta_x)$ being examined.

(3)(d)(2) Dominance Measure

Another technique for determining synthetic likelihoods is the dominance measure. This technique uses $$\kappa'(\delta_w | \delta_x) = \int_{\mathbb{R}^d} \chi(v) \cdot \delta_w(v) dv \quad (22)$$
$$\delta_w \geq \delta_x$$

where $$\chi(v) = \begin{cases} 1 & \text{if } \delta_w(v) \geq \delta_x(v) \\ 0 & \text{otherwise,} \end{cases} \quad (23)$$

where the integral in Equation 22 is typically evaluated by Monte Carlo methods, as described in Numerical Recipes in C, The Art of Scientific Computing, by Press, Teukolsky, Vetterling and Flannery, Cambridge University Press, Second Edition, Chapter 7, which is hereby incorporated by reference. It should be noted that all integrals discussed herein may be calculated through Monte Carlo methods. Additionally, compression by normalization and compression by ranking may both be used with this measure to compress the synthetic likelihoods.

(3)(d)(3) Decoder Measure

Another method for determining synthetic likelihood is the decoder measure. In this technique, $$\kappa'(\delta_w | \delta_x) = \int_{\mathbb{R}^d} \chi(v) \cdot \delta_w(v) dv, \quad (24)$$
$$\delta_x = \max \delta_w$$
$$\delta_w \in \Delta$$

where $$\chi(v) = \begin{cases} 1 & \text{if } \delta_x(v) = \max_{\delta_w \in \Delta} \delta_w(v) \\ 0 & \text{otherwise} \end{cases} \quad (25)$$

Synthetic likelihoods determined by the decoder measure may be compressed through normalization or ranking.

(3)(d)(4) Empirical Measure

This method uses training data, which is a series of cepstral vectors $\{v_1, v_2, \ldots, v_N\}$. This training set of vectors is determined from speech taken of a person speaking a known text. There is a corresponding true set of probability density functions, $\{\delta_{x_1}, \delta_{x_2}, \ldots, \delta_{x_N}\}$, which are known because the underlying text and acoustic realization of that text are known. There is also a decoded set of probability density functions, $\{\delta_{w_1}, \delta_{w_2}, \ldots, \delta_{w_N}\}$, which are determined by performing speech recognition on the cepstral vectors. Each $\delta$ will be referred to as a "leaf" herein. Thus, there is a true set of leaves and a decoded set of leaves, and these are paired one with the other, on a vector-by-vector basis.

The synthetic likelihood is then determined as $$\kappa'(\delta_w | \delta_x) = \frac{C(w, x)}{C(x)}, \tag{26}$$

where $C(x)$ is the number of times $\delta_x$ occurred among true leaves and $C(w,x)$ is the number of times the true leaf x was paired with the decoder's guess leaf w. Additionally, the synthetic likelihood of Equation 26 may be determined when the decoder does a fall decoding at the word level or when the decoder does a full decoding at the leaf level.

Because Equation 26 guarantees normalization of the synthetic likelihoods, compression through normalization is not necessary. However, compression by ranking may be performed.

(3)(e) Paths and Densities

In this section, it is shown how paths, densities and synthetic likelihoods are related. In general, the valuation (synthesis) of a sequence depends upon a particular path in the evaluation (synthesis) model. This dependency expresses itself in two ways: through the probability of the path, and through the sequence of densities associated with the path.

To begin, hidden Markov model formalism and notation are reviewed; this notation is established as follows:

| | |
|---|---|
| $Q = \{q_m\}$ | a set of states |
| $q_I, q_F$ | respectively, initial and final states; drawn from Q |
| $\tau = \{\tau_{mn}\}$ | the probability of transition $q_m \to q_n$ |
| $\delta = \{\delta_{mn}\}$ | a collection of densities, where $\delta_{mn}$ is the density associated with transition $q_m \to q_n$ |

The collection $<Q, q_I, q_F, \tau, \delta>$ will be referred to as a hidden Markov model H. To distinguish between different models, corresponding to, for instance, lexemes l(x) and l(w), a subscript will be attached to the hidden Markov model. Thus, a hidden Markov model corresponding to the lexeme l(x) will be referred to as $H_x$, its state set as $Q_x$, a transition probability as $\tau_{xmn}$, and so on.

For a given length-T observation sequence $<\bar{\alpha}_w^i>$, the likelihood of this sequence according to the model H is $$L(\langle \bar{a}_w^i \rangle | H) = \sum_{\pi} p(\langle \bar{a}_w^i \rangle | \pi) p(\pi) \tag{27}$$

$$= \sum_{\pi} \delta_{\pi^0 \pi^1}(\bar{a}_w 0) \ldots \delta_{\pi^{T-1} \pi^T}(\bar{a}_w^{T-1}) \times \tau_{\pi^0 \pi^1} \ldots \tau_{\pi^{T-1} \pi^T}. \tag{28}$$

Here, $\pi$ is sequence of states $<\pi^0, \pi^1, \ldots, \pi^T>$, also called a path; $p(\pi)$ is the probability of the path $\pi$ according to $\tau$; and $p(<\bar{\alpha}_w^i>|\pi$ is the likelihood of the observation sequence according to the densities associated with $\pi$. Since an observation is associated with a transition and not a state, the likelihood of a sequence of T observations is evaluated with respect to a path comprising T transitions and, therefore, T+1 states. A path is considered valid if $\pi^0=q_I$ and $\pi^T=q_F$. The sums in Equations 27 and 28 run over all valid paths in $Q^{T+1}$, the (T+1)-fold Cartesian product of Q with itself.

Consider a restricted model $H_x$ in which every transition is forced. Let $Q_x=\{q_{x0}=q_{xI}, \ldots, q_{xT}=q_{xF}\}$, with $T=|Q_x|-1$, and suppose the only transitions with non-zero probability are $q_{xm} \to q_{xm+1}$. Then there is only one valid path through this model, which is $$\pi_x = q_{x0} \ldots q_{xT}$$

and its probability is unity. Thus, the sum in Equation 28 collapses, and the following results $$L(\langle \bar{\alpha}_w^i \rangle | H_x) = \delta_{x01}(\bar{\alpha}_w^0) \delta_{xT-1T}(\bar{\alpha}_w^{T-1}) \ldots \delta_{xT-1T}(\bar{\alpha}_w^{T-1}) \tag{29}$$

for the length-T observation sequence $<\bar{\alpha}_w^i>$.

Suppose now that an observation sequence $<\bar{\alpha}_w^i>$ is being synthesized according to an identically restricted model $H_w$, so that there is only one valid path $\pi_w=q_{w0} \ldots q_{wT}$ through this model. An event synthesized by this model is a sequence of synthetic observations of length T, with sample $\hat{\alpha}_w^0 \sim \delta_{w01}$, sample $\hat{\alpha}_w^1 \sim \delta_{w12}$, and so on. Conversely, evaluation model $H_x$ concentrates all its probability mass on observation sequences of length T, evaluating the likelihood of the first observation according to $\delta_{x01}$, and so on. Thus, it is written $$L(H_w | H_x, \pi_w, \pi_x) = \kappa(\delta_{w\,01} | \delta_{x\,01}) \kappa(\delta_{w\,12} | \delta_{x\,12}) \ldots \kappa(\delta_{w\,T-1T} | \delta_{x\,T-1T}) \tag{30}$$

for the synthetic likelihood of $H_w$ according to $H_x$.

The paths $\pi_x$ and $\pi_w$ determine which $\kappa$ values appear in the product. A given $\kappa(\delta_{w\,mn} | \delta_{x\,rs})$ is present precisely when the corresponding transitions $q_{w\,m} \to q_{w\,n}$ and $q_{x\,r} \to q_{x\,s}$ are traversed in the same discrete time interval in $H_w$ and $H_x$, respectively. The path probabilities themselves do not appear explicitly above because they are both unity, due to the restrictive transition structure of each model. In the sections that follow, this disclosure shows how this restrictive assumption may be removed.

(3)(f) Confusability of Hidden Markov Models

This section details how confusability is determined from evaluation and synthesizer models that are hidden Markov models. This section proceeds as follows. First, this section presents a visual argument of how a product machine is designed from two hidden Markov models and how an exemplary probability flow matrix, M, is determined from the product machine. Next, this section describes a more mathematically formal argument for determining the product machine, the probability flow matrix that is determined from the product machine, and acoustic confusability.

(3)(f)(1) Product Machine Determination: a Visual Example

Figure 3:
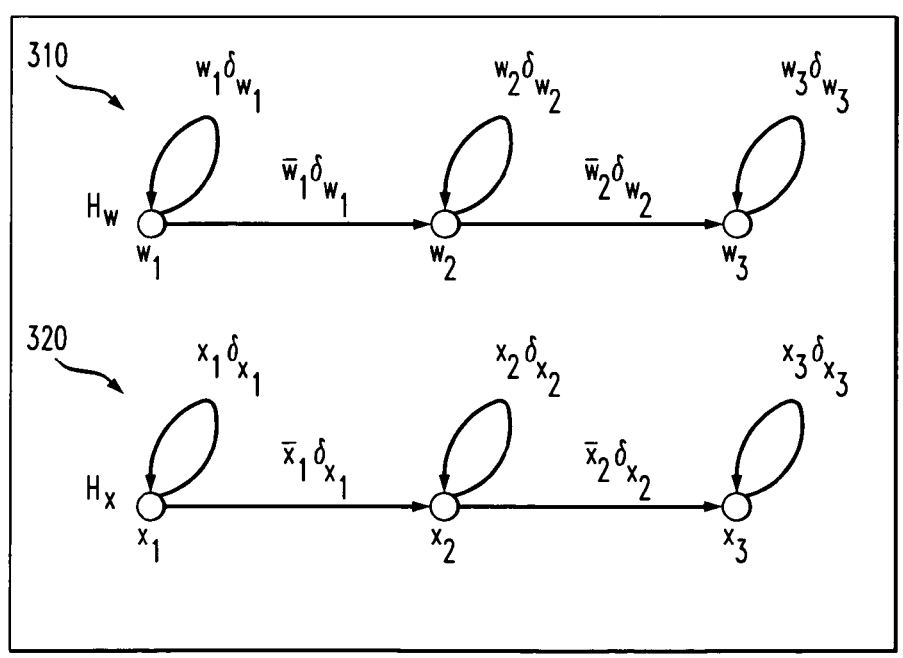
FIG. 3 is a diagram of evaluation and synthesizer models, in accordance with one embodiment of the present invention.

In what follows, $H_x$ is the valuation model, and $H_w$ is the synthesizer model. For simplicity, it is assumed that both $H_x$ and $H_w$ are three-state models of single phones, with the topology, densities and transition probabilities as depicted in FIG. 3. However the construction is entirely general, and there is no need to restrict the size or topology of either model. FIG. 3 shows synthesizer model 310, $H_w$, and evaluation model 320, $H_x$. Here $H_x$ has states $Q_x=\{x_1, x_2,$ $X_3$}, transition probabilities $x_1$, $\bar{x}_1$, $x_2$, $\bar{x}_2$ and $x_3$ associated with the arcs as shown, and densities $\delta_{x1}$, $\delta_{x2}$, $\delta_{x3}$, associated as shown. The model $H_w$ has states $Q_w = \{w_1, w_2, w_3\}$, transition probabilities $w_1$, $\bar{w}_1$, $w_2$, $\bar{w}_2$ and $w_3$ associated with the arcs as shown, and densities $\delta_{w1}$, $\delta_{w2}$, $\delta_{w3}$, associated as shown. In the following discussion, both a state and a transition probability will have the same notation. For example, a state $<x_1>$ in the evaluation model has transition probabilities $x_1$ and $\bar{x}_1$.

Figure 4:
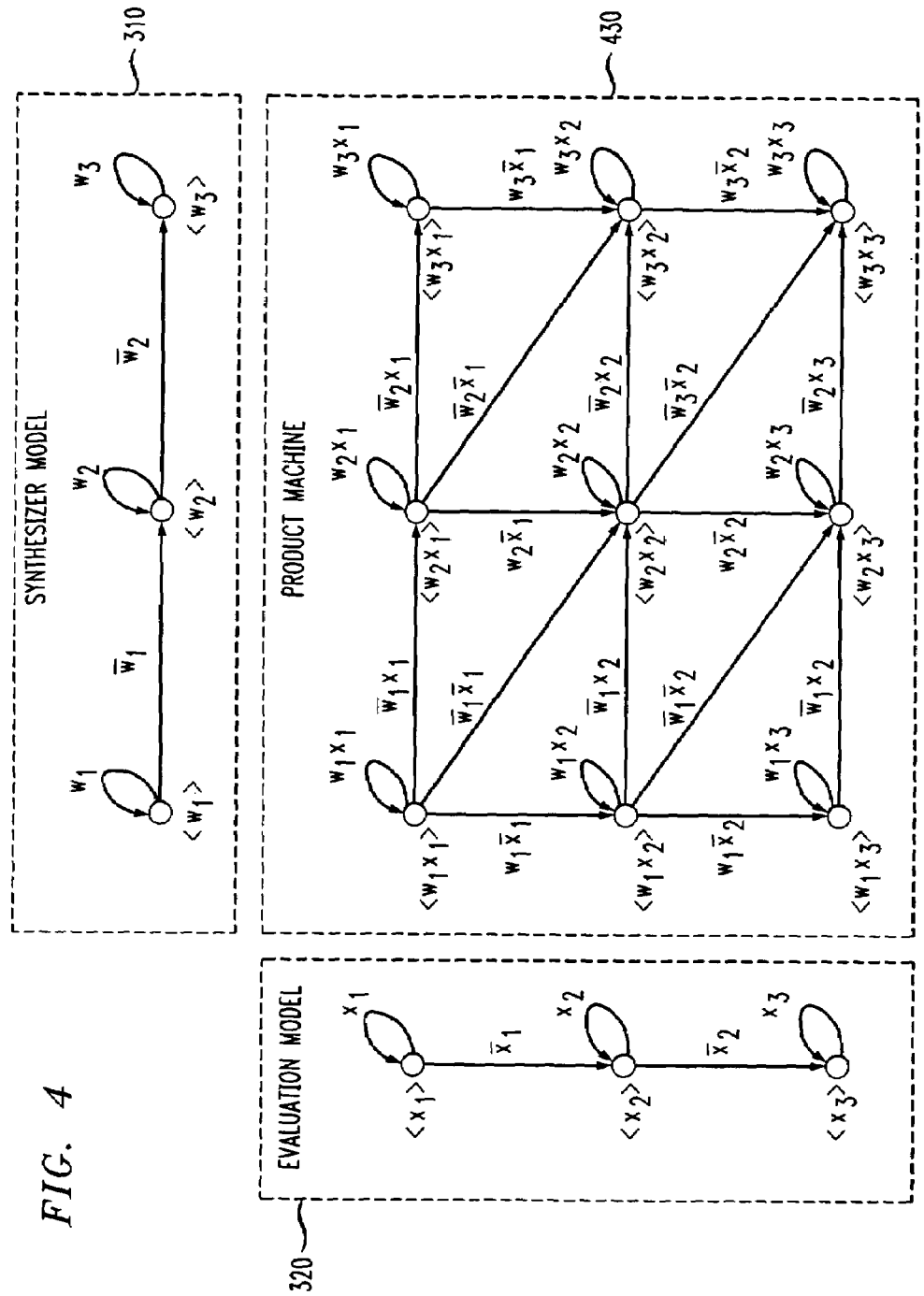
FIG. 4 shows an evaluation model, a synthesizer model, and a product machine in accordance with one embodiment of the present invention.

From the two hidden Markov models shown in FIG. 3, a product machine may be created. Turning now to FIG. 4, this figure shows synthesizer model 310, evaluation model 320 and a product machine 430. The product machine is created from the synthesizer 310 and evaluation 320 models.

It should be noted that these probability density functions for both models may be determined in part by the history, h. This can allow the product machine 430 to account for context. It should also be noted that the hidden Markov models for the evaluation model 320 and synthesizer model 310 may include additional transitions not shown. For instance, there could be a transition from state $<x_2>$ to state $<x_1>$ and from state $<x_3>$ to state $<x_2>$ for the evaluation model. The product machine 430 and the probability flow matrix, to be described below, can take these transitions into account.

Product machine 430 comprises a number of product machine states $<w_1x_1>$ through $<w_3x_3>$. These are called product machine states simply to differentiate them from the hidden Markov model states associated with synthesizer model 310 and evaluation model 320. Each product machine state is named with a pair of states—one of the states of the synthesizer model 310 and one of the states of the evaluation model 320. Thus, product machine state $<w_ix_j>$ corresponds to state $<w_i>$ of the synthesizer model 310 and state $<x_j>$ of the evaluation model 320, while product machine state $<w_3x_2>$ corresponds to state $<w_3>$ of the synthesizer model 310 and to state $<x_2>$ of the evaluation model 320. Therefore, each product machine state corresponds to a pair of states of the synthesizer 310 and evaluation 320 models, where "pair" is to be interpreted as one state of the synthesizer model 310 and one state of the evaluation model 320.

For a synthesizer model 310 having m states and an evaluation model 320 having n states, there will be n x m product machine states in the product machine 430. Thus, for a synthesizer model 310 having 3 states and an evaluation model 320 having 3 states, there will be 9 product machine states in the product machine 430.

Each product machine transition has a probability associated with it. These transition probabilities are determined as the product of the corresponding transition probabilities in the synthesizer model 310 and evaluation model 320. Each product machine transition corresponds to a possible transition a state of the synthesizer model 310 and a possible simultaneous transition within evaluation model 320. For instance, product machine state $<w_1x_1>$ corresponds to state $<w_1>$ of the synthesizer model 310 and state $<x_1>$ of the evaluation model 320. The possible transitions out of state $<w_1>$ of the synthesizer model 310 are the transition from state $<w_j>$ to state $<w_2>$ (having probability $\bar{w}_1$) and the transition from state $<w_1>$ to itself (having probability $w_1$). Therefore, the two allowed transitions are either looping back to the same state or leaving this state. Similarly, the two allowed transitions for state $<x_1>$ of the evaluation model 320 are looping back to the same state (having probability $x_1$) or leaving this state (having probability $\bar{x}_1$).

Therefore, the transitions from product machine state $<w_1x_1>$, which is essentially a combination of state $<w_1>$ of the synthesizer model 310 and state $<x_1>$ of the evaluation model 320, are as follows. One product machine transition is a loop back transition to the same state, which has probability of $<w_1x_1>$. When there is a transition out of state $<w_1>$ of the synthesizer model 310 but there is a loop back for state $<x_1>$ of the evaluation model 320, then the product machine state $<w_1x_1>$ will transition to product machine state $<w_2x_1>$, according to the probability $\bar{w}_1x_1$. Similarly, when there is a loop back for state $<w_1>$ of the synthesizer model 310 but a transition out of state $<x_1>$ to state $<x_2>$ of the evaluation model 320, then the product machine state $<w_1x_1>$ will transition to product machine state $<w_1x_2>$, according to the probability $w_1\bar{x}_1$. Finally, when state $<w_1>$ of the synthesizer model 310 transitions to state $<W_2>$ and state $<x_1>$ of the evaluation model 320 transitions to state $<x_2>$, then the product machine state $<w_1x_1>$ will transition to product machine state $<w_2x_2>$, according to the probability $\bar{w}_1\bar{x}_1$.

The other product machine transition probabilities and product machine transitions may be similarly determined.

Figure 5:
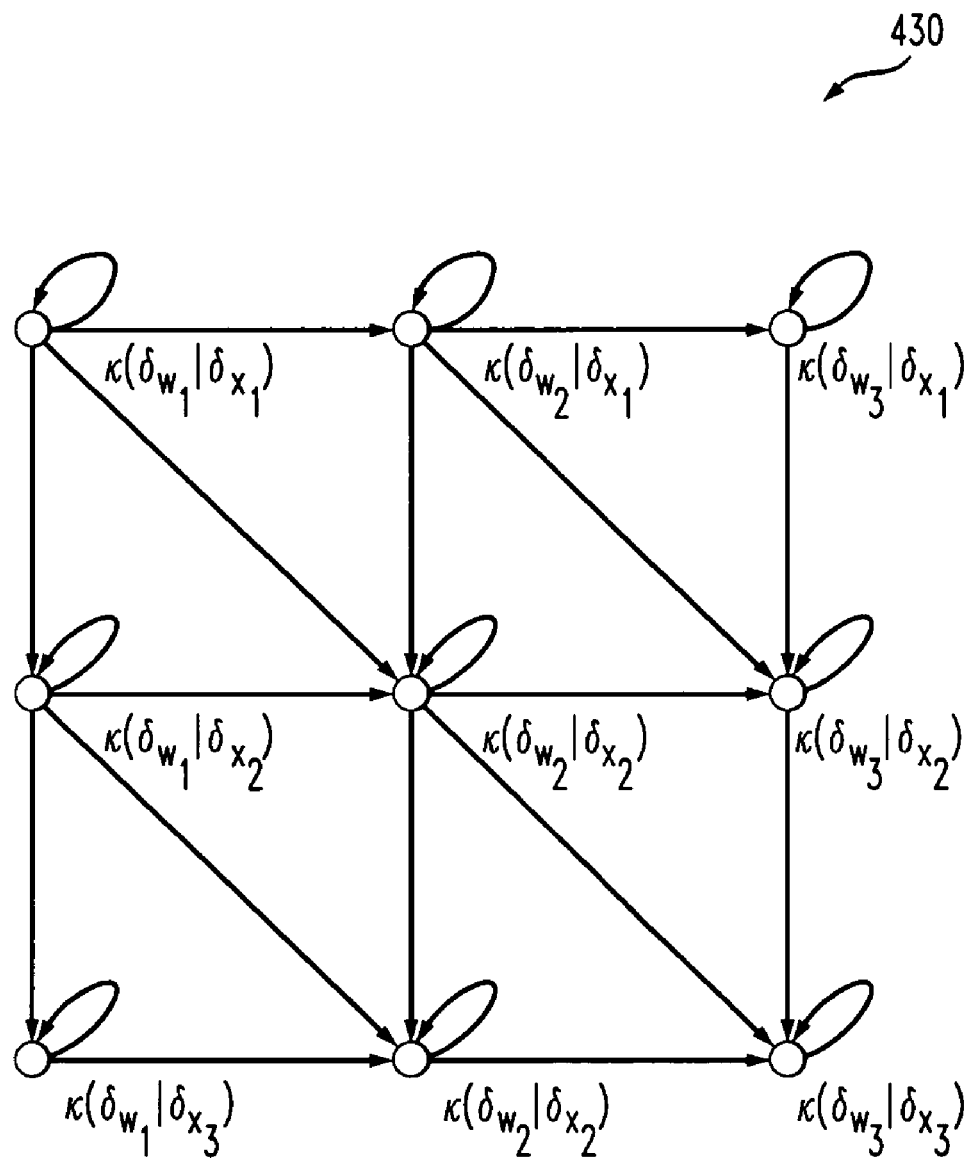
FIG. 5 shows the product machine of FIG. 4.

Note that each product machine state has a synthetic likelihood associated with it. These synthetic likelihoods are shown in FIG. 5. For instance, product machine state $<w_1x_1>$ would have the synthetic likelihood $\kappa(\delta_{w1}|\delta_{x1})$ associated with it, product machine state $<w_1x_2>$ would have the synthetic likelihood $\kappa(\delta_{w1}|\delta_{x2})$ associated with it, and product machine state $<w_2x_3>$ would have the synthetic likelihood $\kappa(\delta_{w2}|\delta_{x3})$ associated with it. Note that these generally will be synthetic likelihoods that have been compressed through the compression techniques previously described.

Referring now to FIG. 6, with appropriate reference to FIGS. 4 and 5, FIG. 6 shows a probability flow matrix 600 that is populated using the product machine 430 of FIGS. 4 and 5. Matrix 600 comprises "from" row 630 and "to" column 640. An element in the matrix will contain a probability value only if a transition exists from one of the product machine states in row 630 to one of the product machine states in column 640. If there is no transition, the matrix element will be zero, meaning that there is no probability associated with the element. Each element of probability flow matrix 600 therefore corresponds to a potential transition between product machine states. Which elements of matrix 600 that will contain probabilities depend on which transitions are valid in the hidden Markov models for the evaluation and synthesizer models. Similarly, which potential transitions between product machine states that will correspond to actual product machine transitions between the product machine states will also depend on which transitions are valid in the hidden Markov model for the evaluation and synthesizer models.

The following examples illustrate these principles. There is a product machine transition from product machine state $<w_1x_1>$ (of row 630) to product machine state $<w_1x_1>$ (of column 640). In product machine 430, this is the loop back transition that has transition probability $<w_1x_1>$. Thus, element 601 has a probability associated with it. This probability is expressed as $w_1x_1\kappa(\delta_{w1}|\delta_{x1})$, where the synthetic likelihood is generally a synthetic likelihood that has been compressed (as previously discussed). However, there are no additional product machine transitions into product machine state $<w_1x_1>$; therefore, the rest of the row in which element 601 occurs contains elements that are zero, which means that no probabilities are associated with these elements. In fact, the diagonal elements should each contain probabilities, as there are loop back probabilities for each of the exemplary product machine states of FIG. 6. There is also a product machine transition from product machine state $<w_1x_1>$ (of row 630) to product machine state $<w_2x_1>$ (of column 640). Thus, element 606 contains a probability. This probability is expressed as $\overline{w}_1x_1\kappa(\delta_{w1}|\delta w_1)$. Similarly, there is a product machine transition from product machine state $<w_2x_3>$ (of row 630) to product machine state $<w_3x_3>$ (of column 640). Thus, element 623 contains a probability. This probability is expressed as $\overline{w}_2x_3\kappa(\delta_{w2}|\delta_{x3})$. However, there is no product machine transition from product machine state $w_3x_3$ to product machine state $<w_2x_3>$, and this element is zero.

If this process is continued through all of the elements of matrix 600, there will be 25 elements that contain a probability and 56 elements that are zero. The 25 elements that contain a probability are numbered 601 through 625. Consequently, matrix 600 is a sparsely populated matrix.

It is also possible to mathematically determine whether an element of matrix 600 should be populated. A matrix element $M_{ij}$, where each i or j refers to a pair of states from the evaluation and synthesizer models, will be zero unless $$M_{ij} = \tau(j \to i) \cdot \kappa(j \to i), \tag{31}$$

which means that a product machine state j transitions to product machine state i. The term $\tau(j \to i)$ indicates the synthetic probability of transitioning between these states and the term $\kappa(j \to i)$ indicates the synthetic likelihood for the product machine transition. For example, $M_{65}$ is element 614 and contains a probability because product machine state $<w_2x_2>$ transitions to product machine state $<w_3x_2>$ (see FIG. 4). The associated probability will be $w_2\overline{x}_2\kappa(\delta_{w2}|\delta_{x2})$. On the other hand, there is a zero for $M_{78}$ because there are no transitions between product machine state $<w_2x_3>$ and product machine state $<w_1x_3>$.

It should be noted that probability flow matrix 600 (also referred to as the matrix "M" below) could contain more non-zero elements if the hidden Markov models for the evaluation model 320 and synthesizer model 310 are changed. For instance, if there is an allowed transition from state $<w_2>$ of the synthesizer model 310 to state $<w_1>$ of the synthesizer model 310, matrix element $M_{14}$ would contain a probability.

Because of the sparse nature of probability flow matrix 600, there are some speed enhancements that may be used to dramatically decrease computation time and resources when calculating confuisability using a probability flow matrix. These enhancements are discussed in more detail below.

(3)(f)(2) Product Machine Determination and Confusability

Now that a visual representation of a product machine and its resultant probability flow matrix have been described, a more formal argument concerning these is given. This section develops a construction that defines a confusability measure between arbitrary hidden Markov models. This measure comprises observation sequences synthesized over all valid paths of all lengths, and yields an efficient algorithm that gives an exact result.

This approach in many ways resembles a forward pass algorithm, used to determine the assignment by a hidden Markov model of likelihood to a given sequence of observations, which is now briefly reviewed. The forward pass algorithm operates on a trellis, which is a rectangular array of nodes with as many rows as the number of states in the model, and as many columns as the number of observations plus one. Each column of nodes constitutes one time slice of the trellis. Starting with likelihood 1 assigned to the initial state at the first time slice (and hence mass 0 assigned to all other states in this time slice), the algorithm assigns a likelihood to each state at each time, according to the equation $$\gamma_s^{t+1} = \sum_{s' \to s} \gamma_{s'}^t \cdot \tau_{s's} \cdot \delta_{s's}(o^t) \tag{32}$$

which is called a forward trellis equation. Here $\gamma_s^t$ is the likelihood of state s at time t, $\tau_{s's}$ is a transition probability, and $\delta_{s's}(o^t)$ is the likelihood of the observation $o^t$ recorded at time t. The notation $s' \to s$ on the summation means that the sum is taken over all states s' with arcs incident on s. For a sequence of T observations, the value $\gamma_F^T$ computed for the final state F at the last time slice T is then the likelihood that the model assigns to the complete sequence.

As in the forward pass algorithm, this analysis proceeds by unrolling a state machine into a trellis, writing suitable forward trellis equations, and computing probabilities for trellis nodes. The key difference is that this analysis does not operate with respect to a given sequence of true observations. Here the observations are being synthesized. This means that there is no natural stopping point for the trellis computation. It is unclear as to what time T should be declared as the end of the synthesized observation sequence. Additionally, it is unclear as to what time T the mass, assigned to the final state in a time slice, should be taken as the synthetic sequence likelihood. To resolve this problem, the analysis operates on an infinite trellis and sums the probability assigned to the final state over all time slices.

From the two hidden Markov models shown in FIG. 3, the product machine $H_{w|x}$ is defined as follows. First, the following notation and definitions are set out:

| | |
|---|---|
| $Q_{w|x} = Q_w \times Q_x$ | a set of states |
| $q_{w|xI} = <q_{wI}, q_{xI}>$ | an initial state |
| $q_{w|xF} = <q_{wF}, q_{xF}>$ | a final state |
| $\tau_{w|x<w_m,x_r>,<w_n,x_s>} = \tau_{w\,mn}\tau_{x\,rs}$ | a set of transition probabilities. |

The states and transitions of this product machine have been shown in FIG. 4. The synthetic likelihoods are shown in FIG. 5. Although superficially $H_{w|x}$ shares many of the characteristics of a hidden Markov model, it is not in fact a model of anything. In particular the arcs are not labeled with densities, from which observation likelihoods may be computed. Instead, an arc $<w_m,x_r> \to <w_n,x_s>$ is labeled with the synthetic likelihood $\kappa(\delta_{w\,m\,n}|\delta_{x\,r\,s})$, and this quantity is treated as the likelihood, according to $\delta_{x\,r\,s}$, of observing a sample generated according to $\delta_{w\,m\,n}$.

Now observe that any path taken through the state diagram of $H_{w|x}$ is a sequence $<w^0x^0>, <w^1x^1> \ldots$ of pairs of states of the original machines, $H_w$ and $H_x$. There is a natural bisection between sequences $\pi_{w|x}$ of state pairs, and pairs of state sequences $<\pi_w,\pi_x>$. Moreover, every pair $<\pi_w,\pi_x>$, of valid paths of identical lengths in $H_w$ and $H_x$ respectively, corresponds to a path in $H_{w|x}$, and conversely. Thus, a computation that traverses all valid paths in $H_{w|x}$ comprises all pairs of same-length valid paths in the synthesizer and valuation models.

Figure 7:
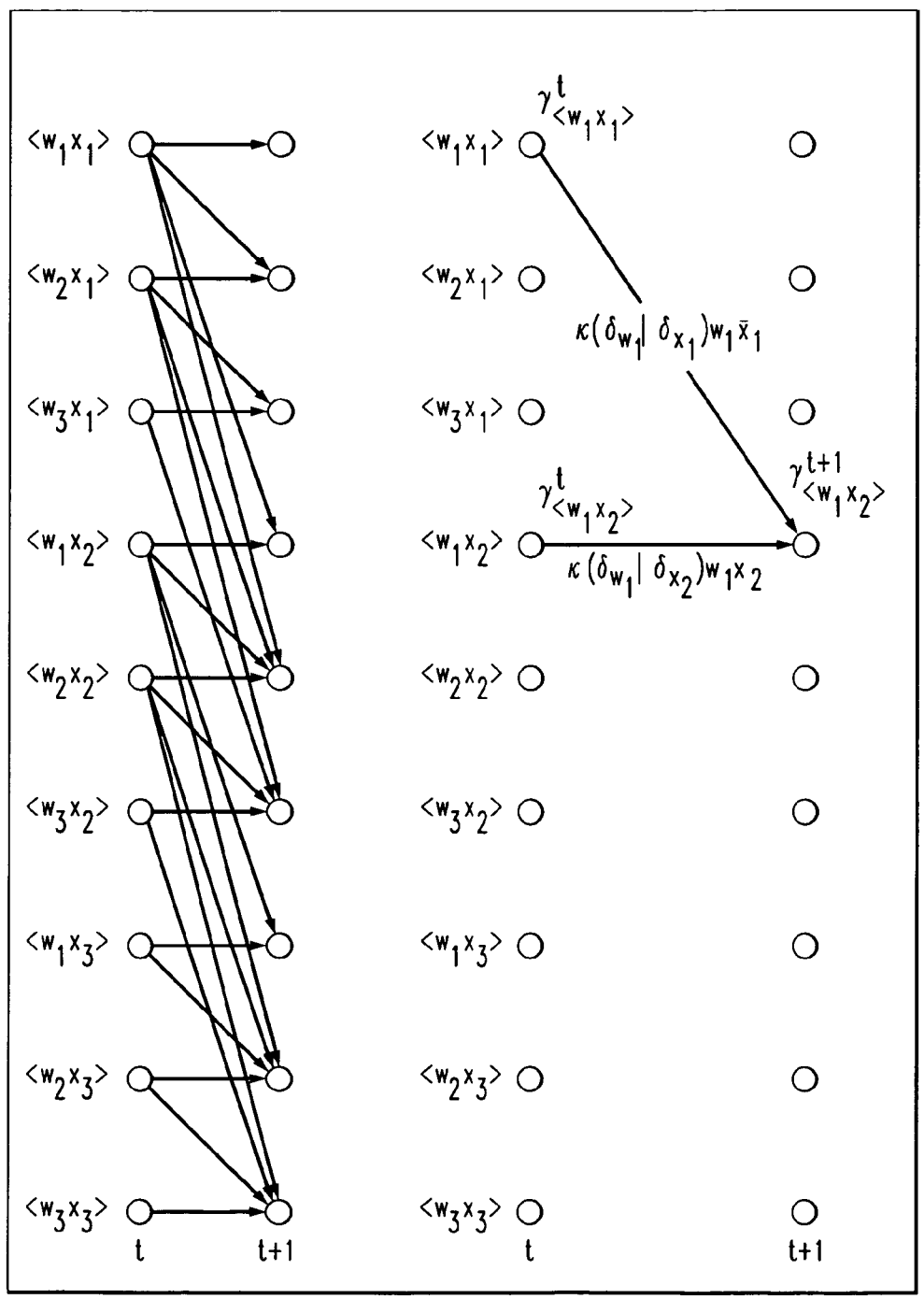
FIG. 7 is a diagram of a trellis of $H_{w|x}$, in accordance with one embodiment of the present invention.

A trellis for the state-transition graph of FIG. 4 is constructed, and appropriate forward trellis equations are written, with synthetic likelihoods in place of true observation probabilities. This is shown in FIG. 7. The left panel of FIG.

7 shows two successive time slices in the trellis. The arcs drawn correspond to the allowed state transitions of $H_{w|x}$.

Now the forward trellis equation is derived for state $<w_1x_2>$, as pictured in the right panel of FIG. 7. The aim is to obtain an expression for $\gamma_{<w_1x_2>}^{t+1}$, the likelihood of arriving at this state at time t+1 by any path, having observed t frames of synthetic data for w, as evaluated by the densities of x. It is apparent from the diagram that there are only two ways that this can happen: via a transition from $<w_1x_1>$ and via a transition from $<w_1x_2>$.

Suppose that the synthetic likelihood of arriving in state $<w_1x_1>$ at time t by all paths is $\gamma_{<w_1x_1>}^t$. The probability of traversing both transition $w_1 \to w_1$ in $H_w$ and transition $x_1 \to x_2$ in $H_x$ is $w_1\bar{x}_1$, and the synthetic likelihood of the data corresponding to this transition pair is $\kappa(\delta_{w_1}|\delta_{x_1})$. Thus, the contribution to $\gamma_{<w_1x_2>}^{t+1}$ of all paths passing through $<w_1x_1>$ at t is $$\kappa(\delta_{w_1}|\delta_{x_1})w_1\bar{x}_1\gamma_{<w_1x_1>}^t. \tag{33}$$

Likewise, the contribution from paths passing through $<w_1x_2>$ at t is $$\kappa(\delta_{w_1}|\delta_{x_2})w_1x_2\gamma_{<w_1x_2>}^t. \tag{34}$$

Since these paths pass through different states at time t they are distinct, so their probabilities add and the following results $$\gamma_{<w_1x_2>}^{t+1} = \kappa(\delta_{w_1}|\delta_{x_1})w_1\bar{x}_1\gamma_{<w_1x_1>}^t + \kappa(\delta_{w_1}|\delta_{x_2})w_1x_2\gamma_{<w_1x_2>}^t, \tag{35}$$

the forward trellis equation for state $<w_1w_2>$. In a straightforward way, one can write such an equation for every state of $H_{w|x}$.

The following is a crucial observation. Writing $\bar{\gamma}^t$ for the distribution of probability mass across all nine states of $Q_{w|x}$ at time t, one can write $$\bar{\gamma}^t = <\gamma_{<w_1x_1>}^t, \gamma_{<w_2x_1>}^t, \gamma_{<w_3x_1>}^t, \gamma_{<w_1x_2>}^t, \gamma_{<w_2x_2>}^t, \gamma_{<w_3x_2>}^t, \gamma_{<w_1x_3>}^t, \gamma_{<w_2x_3>}^t, \gamma_{<w_3x_3>}^t>^T \tag{36}$$

and likewise $\bar{\gamma}^{t+1}$ for the same vector one time step later. Given these definitions, by the argument presented above, the complete family of trellis equations is expressed as $$\bar{\gamma}^{t+1} = M\bar{\gamma}^t. \tag{37}$$

Here M is a square matrix of dimension $m^2 \times n^2$, where $m=|Q_x|$, $n=|Q_w|$ and $m \times n=|Q_{w|x}|$, since $|Q_{w|x}|=|Q_w| \cdot |Q_x|$. Note that the elements of M do not depend at all upon t. The sparse structure of M is a consequence of the allowed transitions of $H_{w|x}$, and the numerical values of its entries are determined by transition probabilities and synthetic likelihoods.

By assumption, at time 0 all the probability mass in $\bar{\gamma}^0$ is concentrated on the initial state $<w_1x_1>$, thus $\bar{\gamma}^0=<1 \ldots 0>^T$. By iteration of Equation 37, the sequence of distributions are obtained as follows:

$$\bar{\gamma}^1 = M\bar{\gamma}^0, \bar{\gamma}^2 = M\bar{\gamma}^1 = M^2\bar{\gamma}^0, \bar{\gamma}^3 = M\bar{\gamma}^2 = M^3\bar{\gamma}^0, \tag{38}$$

or in general $\bar{\gamma}^t = M^t\bar{\gamma}^0$. The question still remains as to what the total probability is, over all time, of arriving in the final state $<w_3x_3>$ of $H_{w|x}$. The quantity is written as $\xi_{w|x}$. By summing the set of equations in Equation 38 over all time we have the following result:

$$\xi_{w|x} = [\bar{\gamma}^0]_{<w_3x_3>} + [\bar{\gamma}^1]_{<w_3x_3>} + [\bar{\gamma}^2]_{<w_3x_3>} + [\bar{\gamma}^3]_{<w_3x_3>} + \ldots \tag{39}$$

$$= [\bar{\gamma}^0 + M^1\bar{\gamma}^0 + M^2\bar{\gamma}^0 + M^3\bar{\gamma}^0 + \ldots]_{<w_3x_3>} \tag{40}$$

$$= [(I + M + M^2 + M^3 + \ldots)\bar{\gamma}^0]_{<w_3x_3>} \tag{41}$$

where the notation $[\ ]_{<w_3x_3>}$ denotes the extraction of element $<w_3x_3>$ of the vector enclosed in brackets.

It remains to show how the sum $I+M+M^2+M^3+\ldots$ can be computed. This may be written as follows:

$$S_n = I+M+M^2+M^3+\ldots+M^n; \tag{42}$$

note that this defines an array of individual real-valued sequences. Since every element of M is positive, so too are the elements of $M^j$ for arbitrary j. Hence all the sequences defined by Equation 42 are positive and increasing. The matrix M is convergent if each of the individual sequences of $S_n$ converges as $n \to \infty$, in the usual sense of convergence of a sequence of real numbers. This sequence is written as $S = \lim_{n \to \infty} S_n$ if these limits exist. For notational convenience, for the rest of this section all limits will be taken as $n \to \infty$. The following may be proven: if M is convergent then $M^n \to 0$; if $S_n \to S$ and A is any m×m matrix, then $AS_n \to AS$ and $S_nA \to SA$; if M is convergent then $(I-M)^{-1}$ exists and $S=(I-M)^{-1}$. Proofs of these are shown in Printz et al., "Theory and Practice of Acoustic Confusability," Automatic Speech Recognition: Challenges for the New Millenium, Spoken Language Processing Group, Paris, France, Sep. 18–20, 2000, the disclosure of which is incorporated herein by reference. Thus, I–M is invertible, and $S=\lim_{n \to \infty} S_n$ is its inverse.

Note that a sufficient condition for M to be convergent is that each eigenvalue λ of M satisfy |λ|<1. For then the Jordan canonical form of M is convergent, by a simple comparison argument with geometric series, and hence so is M itself. This is explained in more detail in Herstein, "Topics in Algebra," John Wiley and Sons, New York, N.Y., section 6.6, 1975, the disclosure of which is incorporated herein by reference.

If M is convergent then the following occurs:

$$\xi_{w|x} = [(I-M)^{-1}\bar{\gamma}^0]_{<w_3x_3>}. \tag{43}$$

But it is observed that the vector $(I-M)^{-1}\bar{\gamma}^0$ is just the $<w_1x_1>$ column of the matrix $(I-M)^{-1}$, and the $<w_3x_3>$ element of this vector is sought. More generally, if $\bar{u}_I$ is $\bar{\gamma}^0$, which is to say an m-element vector with a 1 in the position corresponding to the initial state of $H_{w|x}$, and with 0s everywhere else, and if $\bar{u}_F$ is defined likewise, except with a 1 in the position corresponding to the final state of $H_{w|x}$, then $$\xi_{w|x} = \bar{u}_F^T(I-M)^{-1}\bar{u}_I. \tag{44}$$

This is the fundamental definition of the conflisability of $H_w$ given $H_x$. It is the estimate of the likelihood, according to model $H_x$, of observing acoustics synthesized according to $H_w$.

The models $H_w$ and $H_x$ have been treated abstractly, but it should be clear that it is intended for each one to represent a lexeme. Thus, $H_w$ is the hidden Markov model for some lexeme l(w), and likewise $H_x$ for l(x). To exhibit this explicitly the notation may be changed slightly to write $$\xi(l(w) \mid l(x)h) = \bar{u}_F^\top (I - M(l(w) \mid l(x)h))^{-1} \bar{u}_I. \qquad (45)$$

The new quantity $\xi$ is introduced in Equation 45, rather than writing p(l(w)|l(x) h) outright on the left hand side of Equation 45, because practical experience has shown that Equation 45 yields exceedingly small values. Using raw $\xi$ values as probabilities in computations rapidly exhausts the available precision of computers. For this reason Equation 45 is renormalized via the following:

$$p(l(w) \mid l(x)h) = \frac{\xi^{1+\lambda}(l(w) \mid l(x)h)}{\sum_{l(z)\in B} \xi^{1+\lambda}(l(z) \mid l(x)h)}, \qquad (46)$$

where B represents the finite, discrete set of baseforms (lexemes) present in a speech recognition system. The parameter $\lambda$ is present in Equation 45 because without it the probabilities are too sharp. To correct for this problem, the raw $\xi$ values are raised to a fractional power less than one, which reduces the dynamic range of the entire set. The best value of $\lambda$ is experimentally determined, by determining the true error rate for some joint corpus (C,A), and then adjusting $\lambda$ to make the synthetic word error rate $S_A(P,C)$ (see below) match the true value. Experimentally, −0.86 is a good value for $\lambda$.

(4) Determination of Acoustic Perplexity

Once confusability has been determined for a number of word pairs, the acoustic perplexity is determined. As previously discussed, acoustic perplexity may be determined through the following equations, repeated here for convenience:

$$Y_A(P_\theta, C, A) = P_\theta(C|A)^{-1/|C|}, \qquad (2)$$

where $P_\theta(C|A)$ may be determined through any of a number equations such as equations 4 through 6.

It can be shown that under certain conditions acoustic perplexity and lexical perplexity (see Equation 1) are equal. See Printz et al., "Theory and Practice of Acoustic Confuisability," which has been previously discussed and which also discloses additional properties of acoustic perplexity. In Printz, it is also shown that acoustic perplexity is a better predictor of the quality of a language model than is lexical perplexity. Acoustic perplexity may also be used during language model generation, and should provide an improvement over current language model generation techniques.

(5) Determination of Sawer

Synthetic acoustic word error rate (SAWER) is even better than acoustic perplexity in predicting the quality of a language model. SAWER is expressed as follows:

$$S_A(P, C) = \frac{1}{|C|} \sum_{i \in C} (1 - p(w_i \mid a(w_i)h_i)). \qquad (47)$$

SAWER, which is $S_A(P, C)$, may be used not only to predict the quality of a language model but also in language model generation. In Printz, it is shown that SAWER is a better predictor of the quality of a language model than is lexical perplexity and acoustic perplexity.

(6) Multiple Lexemes

So far a closed-form analytic expression for p(l(w)|l(x) h) has been developed; by Equation 11 the results may be combined for the various $l(x) \in x$ to yield p(l(w)|x h). However word w itself may admit several pronunciations.

To account for these multiple pronunciations, assume that $\alpha(w)$ is a set comprised of all the $l(w) \in w$, and furthermore treat the various l(w) as non-overlapping. It then follows that $$p(a(w) \mid xh) = \sum_{l(w) \in w} p(l(w) \mid xh). \qquad (48)$$

This expression treats the differing pronunciations l(w) of w as non-overlapping events in acoustic space. An alternative law for combining these probabilities is via $$p(a(w) \mid xh)) = \prod_{l(w) \in w} p(l(w) \mid xh)^{p(l(w)|wh)} \qquad (49)$$

This is the likelihood of a synthesized corpus of many pronunciations of the word w, with the relative frequencies of the different lexemes taken as proportional to their prior probabilities, p(l(w)|w h).

(7) Continuous Speech

The method developed so far applies only to the recognition of discrete speech. In this section it is shown how it extends naturally to continuous speech, with minor modifications.

For the continuous case, an expression for p($\alpha$(h w r)|x h), where h and r are the left and right contexts respectively, is sought.

The following equation is useful in the development of an expression for p($\alpha$(h w r)|x h). Let X, $X_1$, $X_2 \subset \Omega_x$, with $X = X_1 \cup X_2$, $X_1 \cap X_2 = \emptyset$, and $Y \subset \Omega\gamma$. Providing that $P(X_1) > 0$, and $P(X_2) > 0$, then $$P(Y|X) = p(Y|X_1)P(X_1|X) + P(Y|X_2)P(X_2|X). \qquad (50)$$

This is Lemma 1 in Printz; the proof follows from elementary probability theory. Using Equation 93A, then p($\alpha$(h w r)|x h) becomes $$p(a(hwr) \mid xh) = \sum_{l(x) \in x} p(a(hwr) \mid l(x)h) \cdot p(l(x) \mid xh) \qquad (51)$$

and thus it suffices to develop an expression for p($\alpha$(h w r)|l(x) h). Next, an argument is developed to show that in the Bayes inversion formula, Equation 7, repeated here for convenience, $$p_\theta(w \mid ha(hwr)) = \frac{p(a(hwr) \mid wh) p_\theta(w \mid h)}{\sum_{x \in V} p(a(hwr) \mid xh) p_\theta(x \mid h)}, \quad (7)$$

$p(\alpha(h\ w\ r)|l(x)\ h)$ may be replaced by $p(\alpha(w)|l(x)\ h)$ as developed above.

To see this, begin by splitting the acoustic event $\alpha(h\ w\ r)$ as $\alpha(h)\ \alpha(w)\ \alpha(r)$ making no declaration about how the division boundaries are chosen. Then under the assumption of frame-to-frame independence, the following may be written $$p(\alpha(h\ w\ r)|l(x)\ h) = p(\alpha(h)|l(x)\ h) \cdot p(\alpha(w)|l(x)\ h) \cdot p(\alpha(r)|l(x)\ h). \quad (52)$$

The first and last factors on the right hand side may now be examined. First note that the quantity $p(\alpha(h)|l(x)\ h)$ is essentially a giant acoustic encoding probability, with conditioning information $l(x)$ tacked on. It will now be shown that this quantity is effectively independent of x. Nominally $$p(a(h) \mid (x)h) = \sum_{l(h) \in h} p(a(h) \mid l(h)l(x)) p(l(h) \mid hl(x)), \quad (53)$$

where the sum proceeds over all distinct pronunciations of h. Of course $$p(l(h)|h\ l(x)) \approx p(l(h)|h) \quad (54)$$

to a good approximation. Moreover for any long history h each summand $p(\alpha(h)|l(h)|l(x))$ is dominated by the computation associated with $l(h)$, and hence largely independent of $l(x)$. But for a short history $\alpha(h\ w\ r) \approx \alpha(w\ r)$, and so the factor under discussion is approximated by 1 in Equation 52. Thus, it has been established that $p(\alpha(h)|l(x)\ h) \approx p(\alpha(h)|h) = \zeta_h$, where this defines $\zeta_h$.

Now consider $p(\alpha(r)|l(x)\ h)$. Since $\alpha(r)$ and $\alpha(h)$ are separated by the acoustic event $\alpha(w)$, they are decorrelated as signals. The degree to which this holds of course depends upon $\alpha(w)$. Thus, the following is written $p(\alpha(r)|l(x)h) \approx p(\alpha(r)|l(x))$. Now it is argued as above that $p(\alpha(r)|l(x))$ is either independent of $l(x)$ or should be replaced by 1. Either way, the following is written: $p(\alpha(r)|l(x)) \approx p(\alpha(r)) = \omega_r$, defining $\omega_r$.

Substituting in Equation 52 above, the following may be written $$p(\alpha(h\ w\ r)|l(x)\ h) \approx \zeta_h \cdot p(\alpha(w)|l(x)\ h) \cdot \omega_r. \quad (55)$$

where $\zeta_h$ and $\omega_r$ are both independent of x. Carrying this result into the Bayes formula, Equation 7, the following is obtained $$p(w \mid a(hwr)h) = \frac{p(a(hwr) \mid wh) \cdot p(w \mid h) \cdot p(w \mid h)}{\sum_x p(a(hwr) \mid xh) \cdot p(x \mid h)} \quad (56)$$

$$= \frac{\sum_{l(w) \in w} p(a(hwr) \mid l(w)h) \cdot p(l(w) \mid wh) \cdot p(w \mid h)}{\sum_x \sum_{l(x) \in x} p(a(hwr) \mid l(x)h) \cdot p(l(w) \mid xh) \cdot p(x \mid h)} \quad (57)$$

-continued $$\approx \frac{\sum_{l(w) \in w} \zeta_h \cdot p(a(w) \mid l(w)h) \cdot \omega_r \cdot p(l(w) \mid wh) \cdot p(w \mid h)}{\sum_x \sum_{l(x) \in x} \zeta_h \cdot p(a(w) \mid l(x)h) \cdot \omega_r \cdot p(l(x) \mid xh) \cdot p(x \mid h)} \quad (58)$$

$$\approx \frac{p(a(w) \mid wh) \cdot p(w \mid h)}{\sum_x p(a(w) \mid xh) \cdot p(x \mid h)} \quad (59)$$

just as for the case of discrete speech. Thus, to a reasonable approximation, $p(w|\alpha(h\ w\ r)h)$ is the same for both continuous and discrete speech.

However, spoken language is a physical phenomenon, generated by movements of bone, flesh, muscle and air. These are physical entities with non-zero mass and hence non-vanishing inertia. The speech apparatus therefore cannot more instantaneously from one conformation to another, and hence successive frames of speech are necessarily correlated.

Because of this, Equation 59 may be modified by adjoining to $\alpha(w)$ some small portions $\alpha(h^\in)$ and $\alpha(r^\in)$ of the full left and right acoustic context, perhaps a phone or two to the left and right respectively. Thus, Equation 59 is modified to $$p(w \mid a(hwr)h) \approx \frac{p(a(h^\epsilon wr^\epsilon) \mid wh) \cdot p(w \mid h)}{\sum_{x \in V} p(a(h^\epsilon wr^\epsilon) \mid xh) \cdot p(x \mid h)}. \quad (60)$$

This corresponds to extending, with appropriate arcs and transitions, the synthesizer model when building the product machine of FIGS. 4 through 6.

(8) Training of Language Models

Two measures have been defined, which are acoustic perplexity and synthetic acoustic word error rate. These two measures are superior to lexical perplexity in measuring the quality of a language model. Lexical perplexity is further used, not only to evaluate the strength of a language model, but also in deciding upon parameter values describing the language model probabilities. When determining lexical perplexity, the individual probabilities $p(w|h)$ may be decided upon by minimizing the lexical perplexity of a training corpus, $Y_L(p, C) = p(C)^{-1/|C|}$. The optimum may in this case be computed analytically and is given explicitly as the relative frequency $$P(w \mid h) = \frac{c(w, h)}{c(h)}. \quad (61)$$

A pursuit of a minimizing value for the acoustic perplexity of the synthetic acoustic word error rate would yield language models with improved speech recognition performance. However, the situation for acoustic perplexity and synthetic acoustic word error rate is however not as simple as for lexical perplexity. There is no longer an explicit analytic expression for the global minimum for either of these two measures. A numerical apparatus needs to be developed to aid the search for a global (or local) minimum.

Consider the simple case where all words have a unique pronunciation. Then by Equation 28, the following occurs $$p(w|ha(w)) = \frac{p(a(w)|wh)p(w|h)}{\sum_{x \in V} p(a(w)|xh)p(x|h)}. \tag{62}$$

The language models themselves are being sought and the following may be written: $\lambda_{w,h} := p(w|h)$. The acoustic perplexity of a corpus C is $Y_A(\lambda, C, A) P_\lambda(C|A)^{-1/|C|}$. Minimization of this quantity is equivalent to maximizing the quantity $-\log Y_A(\lambda, C, A)$. Thus, $$-\log Y_A(\lambda, C, A) = \frac{1}{|C|} \sum_{i=1}^{|C|} \log\left( \frac{p(a(w_i)|w_i h_i)\lambda_{w_i h_i}}{\sum_{x \in v} p(a(w_i)|xh_i)\lambda_{x h_i}} \right)$$

$$= \frac{1}{|C|} \sum_{h} -\log Y_A(\lambda, h, C, A),$$

where $c(w, h) := |\{i: (w_i, h_i) = (w, h), i=1, \ldots |C|\}|$ and $$-\log Y_A(\lambda, h, C, A) := \sum_{w \in v} c(w, h) \log\left( \frac{p(a(w)|wh)\lambda_{wh}}{\sum_{x \in v} p(a(w)|xh)\lambda_{xh}} \right). \tag{63}$$

Similarly minimizing the synthetic word error rate, $S_A(\lambda, C, A)$, is equivalent to maximizing $$1 - S_A(\lambda, C, A) = \frac{1}{|C|} \sum_{i=1}^{|C|} \frac{p(a(w_i)|w_i h_i)\lambda_{w_i h_i}}{\sum_{x \in v} p(a(w_i)|xh_i)\lambda_{x h_i}}$$

$$= \frac{1}{|C|} \sum_{h} (1 - S_A(\lambda, h, C, A)),$$

where $$1 - S_A(\lambda, h, C, A) := \sum_{w \in v} c(w, h) \left( \frac{p(a(w)|wh)\lambda_{wh}}{\sum_{x \in v} p(a(w)|xh)\lambda_{xh}} \right). \tag{64}$$

Because the equations $$-\log Y_A(\lambda, C, A) := \frac{1}{|C|} \sum_{h} -\log Y_A(\lambda, h, C, A)$$

and $$1 - S_A(\lambda, C, A) = \frac{1}{|C|} \sum_{h} (1 - S_A(\lambda, h, C, A))$$

have been developed, it is clear that $\lambda_{w,h}$ can be found by maximizing $-\log Y_A(\lambda, h, C, A)$ and $1 - S_A(\lambda, h, C, A)$ for each value of h separately. Consider two slight generalizations of the functions for which further theory will be developed.

Define the functions $$a(\lambda) = \sum_{i=1}^{N} c_i \log \sum_{j=1}^{m} \frac{a_{ij}\lambda_j}{\sum_{j=1}^{m} b_{ij}\lambda_j} \tag{65}$$

and $$s(\lambda) = \sum_{i=1}^{N} c_i \log \frac{\sum_{j=1}^{m} a_{ij}\lambda_j}{\sum_{j=1}^{m} b_{ij}\lambda_j}. \tag{66}$$

Using the matrix notation $$A = \{a_{ij}\}_{\substack{i=1,\ldots,N \\ j=1,\ldots,M}} \text{ and } B = \{b_{ij}\}_{\substack{i=1,\ldots,N \\ j=1,\ldots,M}}$$

the following may be written:

$$(A\lambda)_i \text{ for } \sum_{j=1}^{M} a_{ij}\lambda_j \text{ and } (B\lambda)_i \text{ for } \sum_{j=1}^{M} a_{ij}\lambda_j.$$

The Equations 65 and 66 then become $$a(\lambda) = \sum_{i=1}^{N} c_i \log \frac{(A\lambda)_i}{(B\lambda)_i} \tag{67}$$

and $$s(\lambda) = \sum_{i=1}^{N} c_i \frac{(A\lambda)_i}{(B\lambda)_i} \tag{68}$$

in this simplified notation. Therefore $a(\lambda) = Y_A(\lambda, h, C, A)$ and $s(\lambda) = S_A(\lambda, h, C, A)$ when $N = M = |V|$, $$a_{wx} = \begin{cases} P(a(w)|wh) & \text{if } x = w \\ 0 & \text{otherwise} \end{cases},$$

$b_{w,x} = P(a(w)|x\,h)$ and $c_w = c(w, h)$.

(8)(a) Steepest Descent Methods

The objective now is to maximize $a(\lambda)$ and $s(\lambda)$ for values of $\lambda$ satisfying $$\sum_{j=1}^{M} \lambda_j = 1.$$

Noting that these two functions satisfy the function relations $a(c\lambda) = a(\lambda)$ and $s(c\lambda) = s(\lambda)$ for any $c > 0$, and letting $f: R^M \to R$ be a $C^1(R^M)$ function satisfying $f(c\lambda) = f(\lambda)$ for all $c > 0$, then the following holds $$\sum_{i=1}^{M} \lambda_i \frac{\partial f}{\partial \lambda_i}(\lambda) = 0 \quad \forall \lambda \in R^M. \tag{69}$$

A proof of Equation 69 is given in Printz. Equation 69 provides a method to locate incrementally larger values for $f(\lambda)$. The following theorem, referred to herein as Theorem 1, specifies a direction that guarantees finding a better value unless a function is being maximized at a boundary point or a point where $\nabla f(\lambda) = 0$.

Theorem 1: Let $f: R^M \to R$ be a $C^2(R^M)$ function such that $f(c\lambda) = f(\lambda)$, $$\sum_{i=1}^{M} \lambda_i = 1,$$

for all $i=1, \ldots, M$ and both $$\frac{df}{\partial \lambda_i}(\lambda) \neq 0$$

and $0 < \lambda_i < 1$ hold for some $i=1, \ldots, M$. Define $$\hat{\lambda}_i^\varepsilon := \lambda_i + \varepsilon \lambda_i \frac{\partial f}{\partial \lambda i}(\lambda).$$

Then there exists a sufficiently small $\epsilon$ such that the following three properties hold $$\sum_{i=1}^{M} \hat{\lambda}_i^\varepsilon = 1, \tag{70}$$

$$\hat{\lambda}_i^\varepsilon \geq 0 \; \forall i=1, \ldots, M \tag{71}$$

and $$f(\hat{\lambda}_i^\varepsilon) > f(\lambda). \tag{72}$$

A proof of Theorem 1 is given in Printz.

Theorem 1 only explains that some value of $\epsilon > 0$ exists, but the theorem does provide a concrete value of $\epsilon$ for which the theorem holds. Such a value may in fact be found using theory developed in Gopalakrishnan, "An Inequality for Rational Functions with Applications to some Statistical Estimation Problems," IEEE Transactions on Information Theory, 37(1), pp. 107–113, 1991, the disclosure of which is incorporated herein by reference. This concrete value has however no practical value as it is far too small to yield an efficient update rule.

(8)(b) A Numerical Optimization Strategy

Theorem 1 guarantees that a better value will be found by choosing $$\hat{\lambda}_i^\varepsilon = \lambda_i + \varepsilon \lambda_i \frac{\partial f}{\partial \lambda_i}(\lambda),$$

$i=1, 2, \ldots, m$ for some value $\epsilon > 0$ unless the function is at a local stationary point. To satisfy the constraint for $i=1, 2, \ldots, m$ it is also required that $\epsilon \leq \epsilon_{max}$, where $$\varepsilon_{max} = \max\left\{\varepsilon : 0 \leq \lambda_i + \varepsilon \lambda_i \frac{\partial f}{\partial \lambda_i}(\lambda) \leq 1, i = 1, 2, \ldots, m\right\} \tag{73}$$

if $$\lambda_i \frac{\partial f}{\partial \lambda_i}(\lambda) \neq 0$$

for some $i=1, 2, \ldots, m$ and $\epsilon_{max} = 0$ otherwise.

To optimize $\alpha(\lambda)$ and $s(\lambda)$ numerically, a standard line maximization routine is used to find a local maximum $\epsilon^{opt}$ for $\alpha(\hat{\lambda}^\epsilon)$ and $s(\hat{\lambda}^\epsilon)$. The procedure is then iteratively repeated, making $\hat{\lambda}^\epsilon$ be the new value of at each consecutive iteration.

In numerical experiments, the golden section search method as well as Brent's method using derivatives were evaluated. These algorithms are described in Press et al., "Numerical Recipes in C: The Art of Scientific Computing," Cambridge University Press, second edition, 1999, the disclosure of which is hereby incorporated by reference. Slightly modified versions, of the implementations in Press of these two algorithms, were used. As the performance of the two methods was very close, the more robust golden section search method was chosen to be used in more extensive experiments. Also the routine for initially bracketing a minimum described in Press was modified to account for the additional knowledge, $0 \leq \epsilon \leq \epsilon_{max}$. A procedure to follow is to iterate the line maximization procedure until a satisfactory accuracy for $\lambda$ is achieved or until a very large number of iterations have been made.

(9) Speed Enhancements when Calculating Confusability

Both computations of $\alpha(\lambda)$ and $s(\lambda)$ require the computation of the matrix-vector products $A\lambda$ and $B\lambda$. The matrices A and B have dimensions n×m, which for a typical speech recognition vocabulary would be 70,000×70,000. In other words A and B have $70,000^2 = 4.9 \times 10^9$ elements. In reality A is stored as a diagonal matrix and B as a sparse matrix containing approximately $10^8$ elements. This means that the computation of $\alpha(\lambda)$ and $s(\lambda)$ each requires at least $10^8$ multiplications. Repeated evaluation of $\alpha(\lambda)$ and $s(\lambda)$ is going to be very costly and optimizing these functions will be infeasible unless there are computational savings when optimizing with respect to $\epsilon$.

The most important saving comes from the observation that $$a(\lambda + \varepsilon v) = \sum_{i=1}^{N} c_i \log \frac{(A\lambda)_i + \varepsilon(Av)_i}{(B\lambda)_i + \varepsilon(Bv)_i} \quad (74)$$

and $$s(\lambda + \varepsilon v) = \sum_{i=1}^{N} c_i (A\lambda)_i + \frac{\varepsilon(Av)_i}{(B\lambda)_i + \varepsilon(Bv)_i} \quad (75)$$

In particular the choice $v=(v_1, v_2, \ldots, v_m)$, where $$v_i = \lambda_i \frac{\partial a}{\partial \lambda_i} \text{ or } v_i = \lambda_i \frac{\partial s}{\partial \lambda_i},$$

depending on which function is being maximized, corresponds to maximizing $\alpha(\hat{\lambda}^\varepsilon)$ or $s(\hat{\lambda}^\varepsilon)$ with respect to $\varepsilon \geq 0$.

If $\alpha = A\lambda$, $\beta = Av$, $\gamma = B\lambda$ and $\delta = Bv$ are precomputed then the cost of evaluating $s(\hat{\lambda}^\varepsilon)$ for a particular value of is N divisions, 3N additions and 3N multiplications. For $\alpha(\hat{\lambda}^\varepsilon)$ the cost is an additional N logarithm extractions.

Rewriting the formulas in terms of $\alpha$, $\beta$, $\gamma$ and $\delta$, the expressions occur $$a(\hat{\lambda}^\varepsilon) = \sum_{i=1}^{N} c_i \log \frac{\alpha_i + \varepsilon \beta_i}{\gamma_i + \varepsilon \delta_i} \quad (76)$$

and $$s(\hat{\lambda}^\varepsilon) = \sum_{i=1}^{N} c_i \alpha_i + \frac{\varepsilon \beta_i}{\gamma_i + \varepsilon \delta_i}. \quad (77)$$

For Equation 76, this can be further simplified to $$a(\hat{\lambda}^\varepsilon) = \sum_{i=1}^{N} c_i \log\left(\frac{\alpha_i}{\gamma_i}\right) + \sum_{i=1}^{N} c_i \log\left(\frac{1 + \varepsilon \frac{\beta_i}{\alpha_i}}{1 + \varepsilon \frac{\delta_i}{\gamma_i}}\right) \quad (78)$$

$$= a(\lambda) + \sum_{i=1}^{N} c_i \log\left(\frac{1 + \varepsilon e_i}{1 + \varepsilon d_i}\right),$$

where $$e_i = \frac{\beta_i}{\alpha_i} \text{ and } d_i = \frac{\delta_i}{\gamma_i}$$

for $i=1, 2, \ldots, m$. If $e=(e_1, e_2, \ldots, e_m)$ and $d=(d_1, d_2, \ldots, d_m)$ are precomputed, the cost of evaluation $\alpha(\hat{\lambda}^\varepsilon)$ according to Equation 78 is actually 1 addition more than according to Equation 74, but the argument of the logarithm is now close to 1 for small values of $\varepsilon$. This ensures an added degree of numerical stability that is well worth the additional computational cost.

For Equation 77, the following illustrate additional computational savings.

$$s(\hat{\lambda}^\varepsilon) = \sum_{i=1}^{N} c_i \frac{\alpha_i}{\gamma_i} + \sum_{i=1}^{N} c_i \frac{\varepsilon(\beta_i - \alpha_i d_i)}{\gamma_i + \varepsilon \delta_i} \quad (79)$$

$$s(\hat{\lambda}^\varepsilon) = s(\lambda) + \varepsilon \sum_{i=1}^{N} \frac{f_i}{1 + \varepsilon d_i},$$

where $$d_i = \frac{\delta_i}{\gamma_i}$$

as before and $$f_i = c_i \left(\frac{\beta_i - \alpha_i d_i}{\gamma_i}\right)$$

for $i=1, 2, \ldots, m$. After precomputing $\alpha$, $\beta$, $\gamma$, $\delta$, $d=(d_1, d_2, \ldots, d_m)$, and $f=(f_1, f_2, \ldots, f_m)$, the cost of evaluating $s(\hat{\lambda}^\varepsilon)$ for a particular value of $\varepsilon$ according to Equation 79 is N divisions, N+1 multiplications and 2N+1 additions. This is a total of 4N+2 arithmetic operations. Evaluating $s(\lambda)$ for an arbitrary value of $\lambda$ costs approximately $10^8$ arithmetic operations and evaluating $s(\hat{\lambda}^\varepsilon)$ for a particular $\varepsilon$ costs approximately $4N = 4 \times 70{,}000 = 2.8 \times 10^5$ operations after all the precomputation is performed. This means that $s(\hat{\lambda}^\varepsilon)$ can be evaluated for more than 350 different values of $\varepsilon$ for the cost of one general function evaluation once a, $\beta$, $\delta$, i, d, e and $f$ have been precomputed. The precomputation of $\alpha$, $\beta$, $\gamma$, $\delta$, d, e and $f$ costs roughly as much as two general function evaluations of $s(\hat{\lambda}^\varepsilon)$. But this precomputation cost can be cut in half by the observation that once a best choice of $\varepsilon$, i.e. $\varepsilon^{opt}$, is found, the next values for $\alpha$ and $\gamma$ may be computed by the formula $$\begin{pmatrix} a \\ \gamma \end{pmatrix} = \begin{pmatrix} a^{old} \\ \gamma^{old} \end{pmatrix} + \varepsilon^{opt} \begin{pmatrix} a^{old} \\ \gamma^{old} \end{pmatrix}. \quad (80)$$

The only costly precomputation step left is then to recompute $\beta$ and $\delta$ for each new choice of $\lambda$.

In an efficient implementation of the optimization of $s(\lambda)$, the best $\varepsilon$ can be determined for the cost of only slightly more than one general function evaluation per consecutive line maximization if m and N are as large as 70,000.

(9)(a) Efficient Algorithm for Computing Confusability

Returning to FIG. 6, this figure shows a probability flow matrix 600 that has a sparsity structure that corresponds to the product machine shown in FIGS. 4 and 5. As previously discussed, the confusability $\xi_{wlx}$ is defined by Equation 43, repeated here for convenience:

$$\xi_{wlx} \overline{u}_F^T (I-M)^{-1} \overline{u}_I, \quad (43)$$

where M is the probability flow matrix. In this section the disclosure gives an efficient algorithm for computing this quantity.

(9)(a)(1) Conditions Required to Apply the Algorithm

Two conditions must be satisfied to apply the algorithm. First, the synthesizer and evaluation hidden Markov models (hereafter "HMMs"), used to construct the product machine, must have so-called "left-to-right" state graphs. The state graph of an HMM is left-to-right if it is acyclic (that is to say, contains no cycles) except possibly for self-loops (that is to say, transitions from a node to itself). The terminology "left-to-right" suggests that this idea has something to do with the way a state graph is drawn on a page, but in fact its meaning is the purely topological one just given. The HMMs in FIG. 3 and FIG. 4 are all left-to-right.

The HMMs that appear in speech recognition are almost always left-to-right, thus the technique described here can be very widely applied. It should be noted however that even if the underlying synthesizer and evaluator HMMs are not left-to-right, precluding the use of the efficient algorithm that is described below, the general method of computing confusabilities by Equation 43 above may still be applied.

Second, the method described here is efficient in part because the maximum indegree (that is, the number of transitions or arcs impinging on any given node) of the synthesizer and evaluation models is bounded above by a fixed number. The reason for this efficiency is explained further below. For the particular HMMs considered in FIG. 3 (and also FIG. 4), this bound is 2, and in the discussion that follows, the technique will be explained as if this were always so. However, the method applies no matter what the true value of this bound is, though the efficiency of the method may be reduced somewhat.

Two important properties of the product machine follow from these conditions. First, because the state graphs of the synthesizer and valuation models are both left-to-right, so too is the state graph of the product machine that is formed from these two models. As a result, the states of the product machine may be assigned numbers, starting from 1 and proceeding sequentially through the number of states N of the machine, in such a way that whenever there is an arc from state number r to state number s, it follows that $r \leq s$. Such an assignment will be called a "topological numbering." In particular, this numbering may be determined in such a way that 1 is the number of the initial state and N is the number of the final state.

Second, no state of the product machine has more than 4 arcs impinging on it, including self-loops. This is a consequence of the bounded indegree of the synthesizer and valuation models, whose product was taken to obtain the graph of the product machine. In general, if the synthesizer model has maximum indegree $D_w$ and the valuation model has maximum indegree $D_x$, then the maximum indegree of any state of the product machine is $D_w \times D_x$. For instance, in the examples of FIG. 3 (and also FIG. 4), $D_w = D_x = 2$, and the product machine 430 of FIGS. 4 and 5 has maximum indegree $4 = D_w \times D_x$.

The significance of this bound is as follows. It is evident from FIG. 6 that not every possible state-to-state transition in the product machine 430 of FIGS. 4 and 5 is present. This means that only certain elements of the probability flow matrix M may be non-zero. Indeed, the maximum number of non-zero entries in any column of M is the maximum indegree of the product machine. Thus, carrying this example a little further, the maximum number of non-zero entries in any column of M is $4 = D_w \times D_x$. As a result the total number of non-zero entries in the entire matrix M is no greater than $D_w \times D_x \times N$, where N is the total number of states in the product machine (and hence also the number of rows or columns of the matrix M.) This property will be made use of later.

(9)(a)(2) Detailed Description of the Algorithm

Return now to Equation 43 above. Recall that $\bar{u}_I$ is a vector with the same number of elements as there are states in the product machine, and with a value of 1 for the element that corresponds to the initial state of the product machine, and a 0 for every other element. (It is being assumed now that the states of the product machine, which are formally named by pairs of states $<w_r, x_s>$, have been assigned numbers as well, in such a way as to constitute a topological numbering.)

Likewise $\bar{u}_F^T$ is a vector with a 1 for the element that corresponds to the final state of the product machine, and a 0 everywhere else. Thus, Equation 43 selects a single element of matrix $(I-M)^{-1}$, namely the one that lies in the matrix column that corresponds to the initial state of the product machine, and in the row that corresponds to the final state of the machine. For the example considered here, these are respectively the first column (j=1) and the last row (i=9). Consequently, only one element of the matrix $(I-M)^{-1}$ is needed to determine confusability. Because only this element is necessary to determine confusability, certain simplifications may be made in the computation, which are now explained.

To begin, note that in computing the quantity $\xi_{w|x}$ for several word pairs w, x, the κ-quantities for all pairs of densities are computed beforehand. Thus, only the computation the desired element of $(I-M)^{-1}$ is left. It will be shown that because only one element of $(I-M)^{-1}$ is required, a significant simplification in the algorithm obtains, as compared to computation of the complete matrix inverse.

To compute this element, as is known in the art, the inverse of a matrix may be determined by a sequence of elementary row or column operations. See, for instance, Anton, "Elementary Linear Algebra," John Wiley & Sons, Section 1.7, 1973, the disclosure of which is incorporated herein by reference. The following explanation assumes that row operations are performed. The explanation could easily be modified so that column operations are performed. As explained in Anton, recall that to perform the matrix inversion, is suffices to start with a subject matrix, in this case (I–M), and perform a series of elementary row operations converting the subject matrix to I. When this same series of operations is applied in the same order to an identity matrix I, the result is the inverse of the original subject matrix. The difficulty with this method is that for a general N×N matrix, it requires $O(N^3)$ arithmetic operations.

A method is now demonstrated, exploiting both the sparsity structure of (I–M) and the need for just a single element of its inverse, that allows a very substantial reduction in computation, compared to the general method just cited. As an instructive exercise, consider the inversion of a 4×4 matrix (I–M), corresponding to some product machine. By the discussion in the previous section, it is assumed that the nodes in the product machine can be ordered so that the matrix M and hence also (I–M) is lower diagonal, that is, all non-zero elements lie on or below the main diagonal.

Assume that such an ordering has been performed and denote the elements of (I–M) by $\alpha_{ij}$, where the non-zero elements satisfy $1 \leq j \leq i \leq N$. Assume also, with no loss of generality, that the index 1 corresponds to the start state of the product machine, and the index N corresponds to the final state of the product machine. This entails that the desired element of $(I-M)^{-1}$ for these purposes is the row N, column 1 entry.

Now, how to apply a modification of the method of elementary row operations is discussed, and how to obtain the desired simplification in computation is demonstrated.

First, write down an augmented matrix ((I−M)|I), consisting of (I−M) and I written side-by-side as shown below.

$$((I-M) \mid I) = \begin{pmatrix} a_{11} & 0 & 0 & 0 & | & 1 & 0 & 0 & 0 \\ a_{21} & a_{22} & 0 & 0 & | & 0 & 1 & 0 & 0 \\ a_{31} & a_{32} & a_{33} & 0 & | & 0 & 0 & 1 & 0 \\ a_{41} & a_{42} & a_{43} & a_{44} & | & 0 & 0 & 0 & 1 \end{pmatrix}$$

The element $\alpha_{11}$ is converted to unity through multiplication of the first row by $d_1 = 1/\alpha_{11}$, which is an elementary row operation. If a similar operation is performed for each row of the matrix, consisting of multiplication of row i by $d_i = 1/\alpha_{ii}$ in each instance, the following is obtained:

$$((I-M) \mid I) \sim \begin{pmatrix} 1 & 0 & 0 & 0 & | & r_1 := d_1 & \ldots \\ b_{21} & 1 & 0 & 0 & | & 0 & \ldots \\ b_{31} & b_{32} & 1 & 0 & | & 0 & \ldots \\ b_{41} & b_{42} & b_{43} & 1 & | & 0 & \ldots \end{pmatrix}$$

Formally, $b_{ij} = \alpha_{ij}/\alpha_{ii}$ for $1 \leq j \leq i \leq N$ where $d_i = 1/\alpha_{ii}$. Here the symbol "∼" is used to denote similarity by means of a series of elementary row operations. The quantity $r_1$ is defined as shown.

Note that a dot has been placed in certain positions of the augmented matrix, replacing the 0s or 1s previously exhibited there. This is to indicate that operations upon these positions need not be performed, as these positions have no effect upon the outcome of the computation. This is because, by the earlier discussion, only the row 4, column 1 entry of $(I-M^{-1}$ is required. As will be seen, this quantity depends only upon operations performed in the first column of the right submatrix of $((I-M)|I)$; that is, the portion that lies to the right of the vertical bar in our notation. This simplication, which is the elimination of the need to perform any elementary row operations on the remaining N−1 columns of the right submatrix, constitutes the first major element of the present method. Since this eliminates $O(N^3)$ arithmetic operations, compared to the general method for matrix inversion, it is a very significant simplification.

Elementary row operations are performed to zero out the off-diagonal elements of (I−M) one column at a time, starting with the leftmost column and proceeding through the rightmost. For example, operating now upon the leftmost column, to clear the $b_{21}$ element, multiply the first row by $-b_{21}$ and add it to the second row. Likewise to clear the $b_{31}$ element, multiply the first row by $-b_{31}$ and add it to the third row, and so on through each succeeding row. After completing all operations necessary to clear the first column, the following obtains:

$$((I-M) \mid I) \sim \begin{pmatrix} 1 & 0 & 0 & 0 & | & r_1 := d_1 & \ldots \\ 0 & 1 & 0 & 0 & | & r_2 := -b_{21}r_1 & \ldots \\ 0 & b_{32} & 1 & 0 & | & -b_{31}r_1 & \ldots \\ 0 & b_{42} & b_{43} & 1 & | & -b_{41}r_1 & \ldots \end{pmatrix}$$

Having completed the operations to clear the first column, define the quantity $r_2$ as shown. A similar sequence of operations are performed to clear the second column. This yields $$((I-M) \mid I) \sim \begin{pmatrix} 1 & 0 & 0 & 0 & | & r_1 := d_1 & \ldots \\ 0 & 1 & 0 & 0 & | & r_2 := -b_{21}r_1 & \ldots \\ 0 & 0 & 1 & 0 & | & r_3 := -b_{32}r_2 - b_{31}r_1 & \ldots \\ 0 & 0 & b_{43} & 1 & | & -b_{42}r_2 - b_{41}r_1 & \ldots \end{pmatrix}$$

Finally the third column is cleared and the method ends with $$((I-M) \mid I) \sim \begin{pmatrix} 1 & 0 & 0 & 0 & | & r_1 := d_1 & \ldots \\ 0 & 1 & 0 & 0 & | & r_2 := -b_{21}r_1 & \ldots \\ 0 & 0 & 1 & 0 & | & r_3 := -b_{32}r_2 - b_{31}r_1 & \ldots \\ 0 & 0 & 0 & 1 & | & r_4 := -b_{43}r_3 - b_{42}r_2 - b_{41}r_1 & \ldots \end{pmatrix}$$

Note that the original subject matrix (I−M), on the left-hand side of the augmented matrix, has been reduced to the identity, and hence its inverse (or rather the first column of the inverse, since operations on the other columns were intentionally not performed) has been developed in the right half of the augmented matrix. Thus $r_4$ is the desired element of $(I-M)^{-1}$. Moreover, by comparison of the expressions for $r_1$ through $r_4$ with the original matrix elements, it can be seen that:

$$r_1 = \frac{1}{a_{11}},$$

$$r_2 = -\frac{a_{21}r_1}{a_{22}},$$

$$r_3 = -\frac{a_{32}r_2 + a_{31}r_1}{a_{33}},$$

and $$r_4 = -\frac{a_{43}r_3 + a_{42}r_2 + a_{41}r_1}{a_{44}}.$$

It is apparent from this series of expressions that the value $r_4$ depends only on computations performed within its column of the right submatrix, utilizing either elements of the original subject matrix (I−M), or the values $r_1$ through $r_3$. This constitutes the second part of the present method: there is no need to operate upon the (I−M) half of the augmented matrix. The only arithmetic results that are important are the ones that are used in the determination of $r_4$, and these are precisely the expressions for $r_1$ through $r_3$. This yields another savings of $O(n^3)$ operations, compared to a general matrix inversion.

Consider now the effect upon the steps of the preceding description if some matrix entry $\alpha_{ij}$ (and hence also $b_{ij}$, after division by $\alpha_{ii}$) in a particular column j is already zero, due to the sparsity structure of (I−M). It is clear that in such a case, one need not perform any operation on the particular row i in question. (For after all, the only reason for operating upon row i in that column is to reduce $b_{ij}$ to 0, and here one is in the salubrious position of finding this element already zeroed.) Since the number of non-zero elements in any given column of (I−M) is bounded above by 4 (in the general case by $D_w \times D_x$), this means that no more than 4 (in general, $D_w \times D_x$) elementary row operations need be performed in any given column. This is another significant savings, since it reduces $O(N)$ arithmetic operations per column to a constant $O(1)$ operations, depending only upon the topologies of the synthesizer and valuation machines.

The algorithm can now be stated in complete detail. For an N×N matrix, the recurrence formulae are:

$$r_1 = \frac{1}{a_{11}}, \tag{80A}$$

and $$r_i = \frac{\left\{\sum_{k=1}^{i-1} a_{ik} r_k\right\}}{a_{ii}}, \tag{80B}$$

for i=2, . . . , N, where the curly brace notation means that the sum extends only over indices k such that $\alpha_{ik} \neq 0$. The element sought is $r_N$ and so by the recurrence equations displayed above it suffices to compute $r_i$, for i=1 . . . , N.

(9)(a)(3) Comparison with Prior State of the Art

In this section, it is shown that the method detailed above constitutes a significant advance in the state of the art. It should be noted that Equation 43 above by itself constitutes an advance, since it mathematically defines the notion of confusability, with respect to a pair of hidden Markov models. The assertions of novelty and significance here pertain to the method just outlined for efficient computation of the desired element of $(I-M)^{-1}$.

Let us return to the general recurrence formulae (80A) and (80B) above. We now determine the number of arithmetic operations (additions, multiplications or divisions) entailed by these formulae. Consider the expression for the numerator of $r_1$, for i=2, . . . , N, which is $\{\Sigma_{k=1}^{i-1} \alpha_{ik} r_k\}$. Recall that the curly braces mean that the sum proceeds over non-zero entries $\alpha_{ik}$ of the probability flow matrix M. (Note that the numerator of $r_1$ is just 1, a constant that requires no computation.)

Now as previously demonstrated, the number of non-zero entries in M is bounded above by $D_w \times D_x \times N$, where N is the number of states of the machine, and also the number of rows (and columns) of M. Thus the total number of multiplications and additions, required to compute all numerators of all the $r_1$ values, for all i=1, . . . , N, is no more than $D_w \times D_x \times N$. To this we also add a total of N divisions, since to obtain each final $r_1$ value, the numerator must be divided by $\alpha_{ii}$ in each case. Hence the total number of arithmetic operations of all kinds (that is, addition, multiplication or division) required to compute the desired value $r_N$ is no more than $D_w \times D_x \times N + N = (D_w \times D_x + 1) \cdot N$, which is an O(N) expression. This compares with $O(N^3)$ operations for a general matrix inversion, and therefore represents a very substantial reduction in the number of arithmetic operations that must be performed.

For example, recall that N is determined as the product of the number of states in the synthesizer model and the number of states in the valuation model. Since a typical word will contain 5 phonemes, and each phoneme is modeled by a 3-state HMM, this means that N typically attains values of about $(5 \cdot 3)^2 = 225$. Thus we are reducing a computation that requires on the order of $225^3 = 11,390,625$ arithmetic operations to $(4+1) \cdot 225 = 1125$ operations.

(9)(b) Computational caching

If one wishes to compute $\xi_{w|x}$ for all $w \in V$, which will typically be the case, there is a computational saving in reusing computations for similar words. Consider two words $w_1$ and $W_2$, and suppose their pronunciations are identical through some initial prefix of phonemes. (Here we are supposing, as above, that each word has a single pronunciation.) If the synthesizer machines $H_{w_1}$ and $H_{w_2}$ are identical for states i=1, . . . , m, then the values of $\alpha_{ij}$ appearing in (I−M) for rows i=1, . . . , m and all columns will be identical. Hence the values $r_1, r_2, \ldots r_m$ will be identical and once they have been computed once they can be stored and reused. This gives an improvement for long words that have pronunciations that begin in the same way, such as "similar" and "similarity." In this case, the full computation for "similar" can be reused for "similarity" (assuming that right context is being ignored in determining HMM densities).

Figure 8:
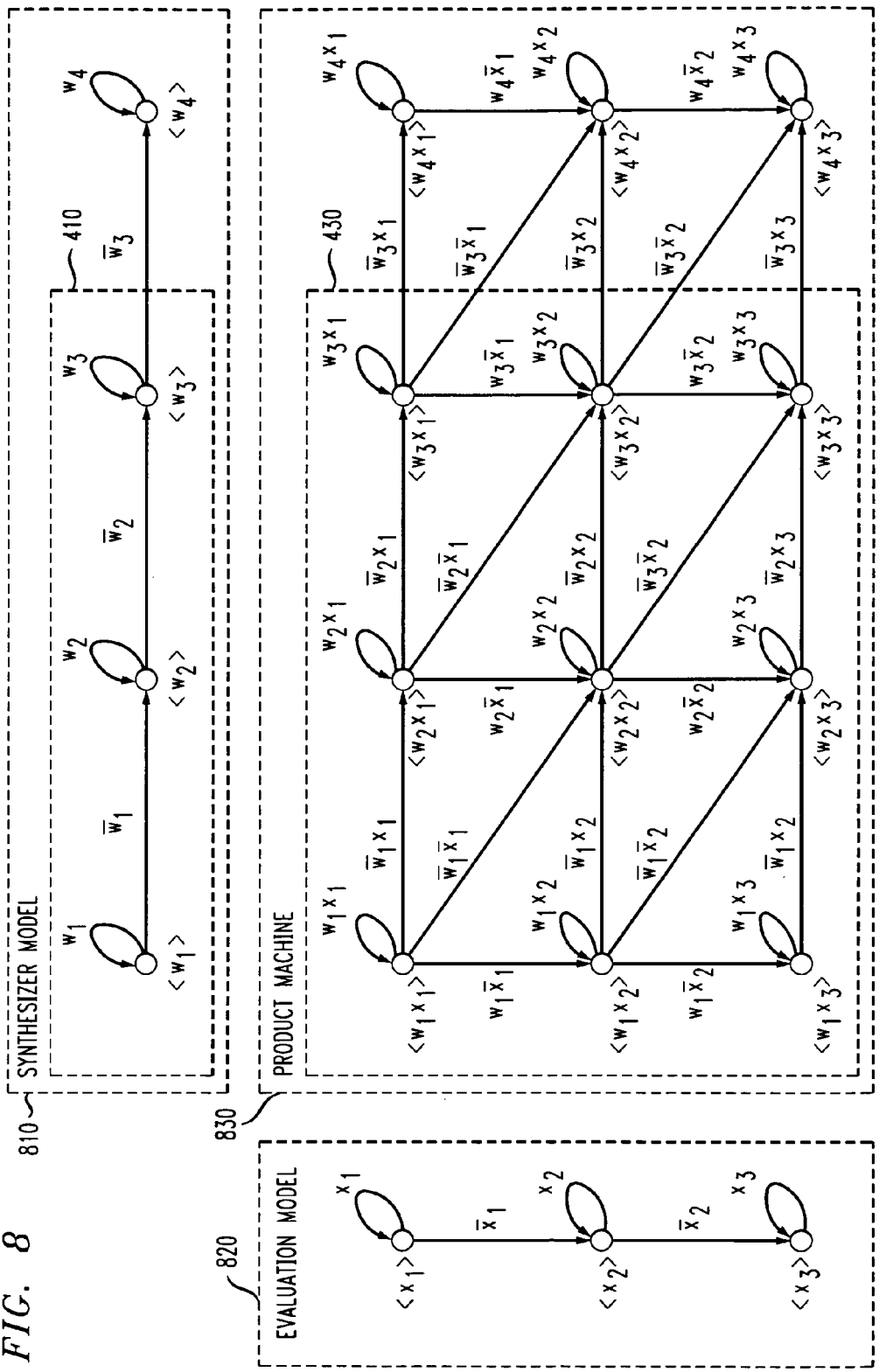
FIG. 8 shows an evaluation model, a synthesizer model, and a product machine in accordance with one embodiment of the present invention.

An example of this is shown in FIGS. 8 and 9. Referring now to FIG. 8, this figure shows a synthesizer model 810, an evaluation model 820 and a product machine 830. Synthesizer model 810 comprises synthesizer model 410 (from FIGS. 3 and 4) and additional state $w_4$. The evaluation model 820 is the evaluation model shown in FIGS. 3 and 4. Consequently, product machine 830 contains product machine 430 (shown in FIGS. 3 and 4) and an additional column of states. State $W_4$ of the synthesizer model 810 causes product machine states $w_4 x_1$, $w_4 x_2$, and $w_4 x_3$ and also causes the appropriate transitions between the product machine states.

Turning now to FIG. 9, this figure shows a probability flow matrix 900 that is populated using the product machine 830 of FIG. 8. Also shown in FIG. 9 is a column 930 that corresponds to the leftmost column of ((I−M)|I). Probability flow matrix 900 contains probability flow matrix 600, which was shown FIG. 6. Additionally, the new state $W_4$ of the synthesizer model 810 of FIG. 8 causes entries 901 through 910 to be populated with probabilities. Determination of these types of probabilities has been previously discussed in reference to FIG. 6. From FIG. 9 and the previous discussion on Computational Caching, it can be seen that $r_1$ through $r_9$ will already be calculated when probability flow matrix 600 is used to determine acoustic confusability for synthesizer model 410 and evaluation model 420. Therefore, these may be held and reused when determining acoustic confusability from probability flow matrix 900, which derives from synthesizer model 810 and evaluation model 420. This is a tremendous time savings, as $r_{10}$ through $r_{12}$ are the only values that need to be determined when probability flow matrix 900 is used to determine acoustic confusability. For instance, it could be that synthesizer model 410 is the synthesizer model for "similar" and synthesizer model 810 is the synthesizer model for "similarity." The results $r_1$ through $r_9$ may be held and reused during the probability flow matrix calculations for "similarity." Likewise, the synthesizer model 810 could be the synthesizer model for "similar." The results for "similar" could be reused when computing acoustic confusability for "similarity." Note that the ordering of the states of the models will affect whether caching can be used for prefixes, suffixes or both.

(9)(c) Thresholding

The idea of thresholding is that if one is not interested in computing $\xi_{w|x}$ for words w and x that are highly distinguishable, then it is not necessary to complete the computation of $\xi_{w|x}$ when it is certain that it will be sufficiently small. In general $\xi_{x|x}$ is used as a template for comparison and $\xi_{w|x}$ is thrown out if it is less than $\epsilon \xi_{x|x}$ for some user specified $\epsilon$. The implicit assumption here is that $\xi_{x|x}$ is likely to be large, compared to some arbitrary word w that is acoustically dissimilar to x. For this to be of any use, there needs to be a way of rapidly estimating an upper bound for $\xi_{w|x}$ and stopping the computation if this upper bound lies below $\epsilon \xi_{x|x}$.

To do this, observe first note that the value of any given $r_i$ in the recurrence equations (80A) and (80B) above may be written as a sum of products between fractions $\alpha_{ik}/\alpha_{ii}$ and previously computed $r_i$ values. Thus we have the bound $$|r_i| \leq (i-1)(\max_{1 \leq k \leq i}|\alpha_{ik}|)(\max_{\{k<i\}} r_k)$$

where the curly braces denote that the second max need run only over those k values for which $\alpha_{ik} \neq 0$.

By using this bound, as the computation of $\xi_{w|x}$ proceeds, it is possible to determine at some intermediate point that $\xi_{w|x}$ will never attain a value greater than the threshold $\epsilon \xi_{x|x}$. At this point the computation of $\xi_{w|x}$ is abandoned, yielding another substantial computational savings.

(10) Additional Applications

As previously discussed, acoustic perplexity and SAWER are beneficial when determining the quality of language models, and therefore in adjusting their parameters. However, there are additional applications of these quantities and methods for determining them.

(10)(a) Vocabulary Selection

Consider a corpus C and a given recognizer vocabulary V. Suppose there is a set of "unknown" words U that appear in C but are not present in V. It is desired to determine which $u \in U$, if any, to add to V.

First note why this is a problem. Augmenting V with some particular u will increase (from 0) the probability that this word will be decoded correctly when a system encounters it. But it also increases the probability that the system will make errors on other words, since there is now a new way to make a mistake.

Adding any given $u \in U$ to V allows one to proceed to estimate the change in error rate that follows from this addition. By the arguments given above, the SAWER on C is $$S_{AV}(C) = \frac{1}{N} \sum_{i \in C} (1 - p_V(w_i | a(w_i) h_i)), \quad (81)$$

where $P_v$ denotes computation of confusabilities with respect to the unaugmented vocabulary V. Assume that $pv(w|\alpha(w) h) = 0$ when $w \notin V$.

Suppose now that an augmented vocabulary $V' = V \cup \{u\}$ is formed. Then recompute the synthetic acoustic word error rate as $$S_{AV'}(C) = \frac{1}{N} \sum_{i \in C} (1 - p_{V'}(w_i | a(w_i) h_i)). \quad (82)$$

It is hoped that $S_{AV'}(C) < S_{AV}(C)$, in other words that adjoining u causes the error rate to drop. Thus, define $\Delta_u$, the improvement due to u, as $$\Delta_u(C) = S_{AV}(C) - S_{AV'}(C) \quad (83)$$

$$= \frac{1}{N} \sum (p_{V'}(w_i | a(w_i) h_i))$$

$$= p_v(w_i | a(w_i) h_i)).$$

Then, vocabulary selection is performed by ranking the elements of U according to $\Delta_u$, adjoining the element with the largest strictly positive improvement, and then repeating the computation.

(10)(b) Selection of Trigrams and Maxent Features

The present invention is also useful when selecting features for maximum entropy models, based upon the acoustic perplexity or SAWER, or their analogs for a general channel (such as translation). The present invention is additionally useful for selecting trigrams (or higher order ngrams), for extending lower-order ngram models, based upon the gain in acoustic perplexity of synthetic acoustic word error rate.

That is, in a similar way to selection of words for vocabularies, one may ask what trigrams should be used to augment a base bigram language model. This question may be analyzed in terms of the effect this augmentation would have on both the acoustic perplexity and synthetic acoustic word error rate.

Consider two language models: a base model p(w|h) and an augmented model $p_{xyz}(w|h)$. Here the latter is obtained as a maximum entropy model, perturbing the base model according to $$p_{xyz}(w|h) = \frac{p(w|h) \cdot e^{\lambda_{xyz} f_{xyz}(w,h)}}{Z(h, \lambda_{xyz})}. \quad (84)$$

The exponent $\lambda_{xyz}$ is determined in the usual maximum entropy manner by the requirement $$E_{p_{xyz}}[C] = E_{\tilde{p}}[C] \quad (85)$$

where $\tilde{p}$ is an empirical model of the corpus.

The most valuable trigrams to use to augment the base model need to be determined. These may be computed by using the decoding probabilities determined with respect to these two different language models, respectively $p(w_i|\alpha(w_i) h_i)$ and $p_{xyz}(w_i|\alpha(w_i) h)$. Define the gain, which measures value according to acoustic perplexity, via $$G_{xyz} = \frac{1}{N} \log \frac{P_{xyz}(C|A)}{P(C|A)} \quad (86)$$

Likewise define the improvement, which measures value according to synthetic acoustic word error rate, via $$\Delta_{xyz} = \frac{1}{N} (P_{xyz}(C|A) - P(C|A)) \quad (87)$$

Both expressions are valid, and experimental methods can be used to determine which measure is appropriate to a particular task.

(11) Additional Confusability Calculation

Presented here are simpler confusability calculations than that presented above. These simpler confusability calculations use edit distances. An edit distance is the amount of phones that must be substituted, added, or removed to change a starting word into an ending word. For example, the word "the" comprises the two phones "TH UH" as one of its lexemes. The word "this" comprises the three phones "TH IX S." The edit distance between "the" and "this" is two: one substitution of "IX" for "UH" and an insertion of "S." This is more easily seen in the following manner. Starting with the phoneme stream for "the," which is "TH UH," substitute "IX" for "UH." The phoneme stream is now "TH IX." Insert an "S" phoneme onto the end of this, and "TH IX S" results, which is the phoneme stream for "this." Thus, the edit distance between "the" and "this" is two, with one insertion, one substitution, and no deletions.

Another technique that calculates edit distances when determining confusability is to weight the operations performed when changing a starting word into an ending word. For instance, deletions might be given a weight of three, substitutions a weight of one, and insertions a weight of two. Then, in the previous example, the modified edit distance would be 3, which is one substitution multiplied by the substitution weight of one, plus one insertion multiplied by the insertion weight of two.

Another technique to calculate edit distances is to assign a cost of an operation when converting a starting word to an ending word. For instance, in the previous example, the cost of substituting IX in place of UH might be 0.5 while the cost of inserting S might be 2.7. The edit distance is therefore 1 substitution at a substitution cost of 0.5, plus one insertion at an insertion cost of 2.7, for a total of 3.2 edit distance.

These weighted edit distances may then be used as the $\zeta(l(w)|l(x)\ h)$ in Equation 45.

(12) Exemplary System

Figure 10:
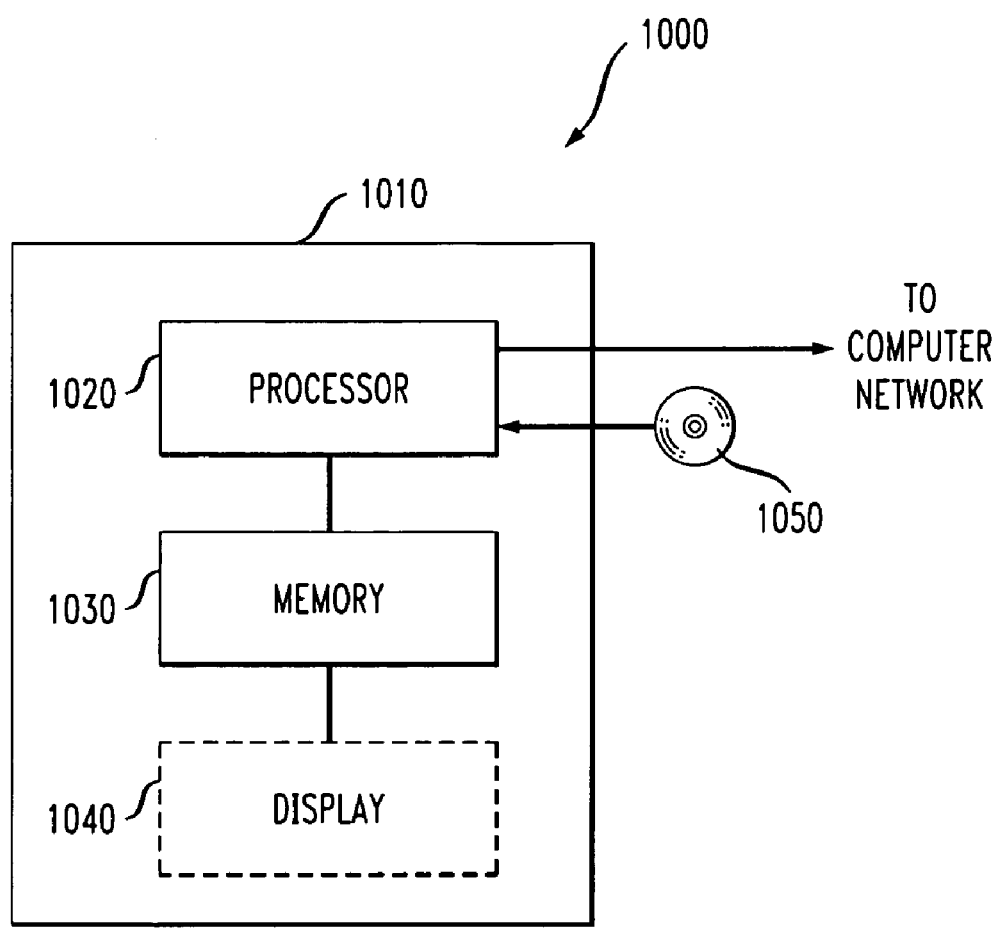
FIG. 10 is a block diagram of a system suitable to carry out embodiments of the present invention.

Turning now to FIG. 10, a block diagram of a system 1000 for determining and using confusability, acoustic perplexity and SAWER is shown. System 1000 comprises a computer system 1010 and a Compact Disk (CD) 1050. Computer system 1010 comprises a processor 1020, a memory 1030 and an optional display 1040.

As is known in the art, the methods and apparatus discussed herein may be distributed as an article of manufacture that itself comprises a computer-readable medium having computer-readable code means embodied thereon. The computer readable program code means is operable, in conjunction with a computer system such as computer system 1010, to carry out all or some of the steps to perform the methods or create the apparatuses discussed herein. The computer-readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 1050.

Memory 1030 configures the processor 1020 to implement the methods, steps, and functions disclosed herein. The memory 1030 could be distributed or local and the processor 1020 could be distributed or singular. The memory 1030 could be implemented as an electrical, magnetic or optical memory, or any combination of these or other types of storage devices. Moreover, the term "memory" should be construed broadly enough to encompass any information able to be read from or written to an address in the addressable space accessed by processor 1010. With this definition, information on a network is still within memory 1030 because the processor 1020 can retrieve the information from the network. It should be noted that each distributed processor that makes up processor 1020 generally contains its own addressable memory space. It should also be noted that some or all of computer system 1010 can be incorporated into an application-specific or general-use integrated circuit.

Optional display 1040 is any type of display suitable for interacting with a human user of system 1000. Generally, display 1040 is a computer monitor or other similar video display.

It is to be understood that the embodiments and variations shown and described herein are merely illustrative of the principles of this invention and that various modifications may be implemented by those skilled in the art without departing from the scope and spirit of the invention.

What is claimed is:

1. A method comprising the steps of:
creating an evaluation model from at least one evaluation phone;
creating a synthesizer model from at least one synthesizer phone;
determining a matrix from the evaluation and synthesizer models, said matrix configured for speech recognition;
creating a new matrix by subtracting the matrix from an identity matrix
determining an inverse of the new matrix; and
determining acoustic confusability by using the inverse of the new matrix.

2. The method of claim 1:
wherein the at least one evaluation phone comprises a first plurality of evaluation phones, the at least one synthesizer phone comprises a first plurality of synthesizer phones; and
wherein the method further comprises the steps of:
creating a new matrix by subtracting the matrix from an identity matrix;
creating an intermediate matrix comprising the new matrix and a second identity matrix;
determining a first set of specific elements of the intermediate matrix; and
determining acoustic confusability from one of the specific elements.

3. The method of claim 2, further comprising the steps of:
creating a second evaluation model comprising the first plurality of evaluation phones and additional evaluation phones;
creating a second matrix from the second evaluation model and the synthesizer model;
creating a second next matrix by subtracting the second matrix from a third identity matrix;
creating a second intermediate matrix comprising the second new matrix and a fourth identity matrix;
determining a second set of specific elements of the intermediate matrix, the specific elements corresponding to a column of the second intermediate matrix, wherein the second set of specific elements comprise the first set of specific elements and a new set of specific elements; and
determining a second acoustic confusability by using previously performed calculations of the first set of elements and by calculating the new set of specific elements.

4. The method of claim 1, wherein the evaluation model comprises a hidden Markov model of the at least one evaluation phone and wherein the synthesizer model comprises a hidden Markov model of the at least one synthesizer phone.

5. The method of claim 4, wherein at least one of the hidden Markov models comprises a plurality of states and a plurality of transitions between states, wherein at least one of the transitions is a transition from one of the states to itself, wherein at least one of the transitions is a transition from one of the states to another of the states, wherein each transition has a transition probability associated with it, and wherein each state has a probability density associated with it.

6. The method of claim 5, wherein the plurality of states comprises a starting state, an ending state and an intermediate state, wherein the plurality of transitions comprise:
a transition from the starting state to itself;
a transition from the starting state to the intermediate state;
a transition from the intermediate state to itself;
a transition from the intermediate state to the ending state; and
a transition from the ending state to itself.

7. The method of claim 1, further comprising the steps of:
creating a new matrix by subtracting the matrix from an identity matrix;
determining an inverse of the new matrix by the following steps:
creating an intermediate matrix comprising the new matrix and a second identity matrix;
determining a specific entry of the second identity matrix that corresponds to acoustic confusability;
determining a specific column or row in which the specific entry resides; and
performing column or row manipulations to create a third identity matrix in the new matrix while calculating only entries of the specific column or row in the second identity matrix; and
selecting the specific entry as the acoustic confusability.

8. The method of claim 1, wherein the step of determining acoustic confusability by using the inverse of the new matrix comprises the step of selecting one element of the inverse of the new matrix as the acoustic confusability.

9. The method of claim 1, wherein the step of determining a matrix from the evaluation and synthesizer models comprises the steps of:
determining a plurality of product machine states; and
determining a plurality of product machine transitions between the product machine states.

10. The method of claim 9, wherein:
each of the product machine states corresponds to one of the states of the evaluation model and one of the states of the synthesizer model;
each of the product machine transitions connects one of the product machine states to the same or another product machine state; and
a product machine transition exists when one or both of the following are true: a transition connects one evaluation model state with the same or another evaluation model state and a transition connects one synthesizer model state with the same or another synthesizer model state.

11. The method of claim 9, wherein the step of determining a matrix horn the evaluation and synthesizer models further comprises the steps of:
determining a product machine transition probability for each of the plurality of product machine transitions; and
determining a synthetic likelihood for each of the product machine states.

12. The method of claim 9, wherein the matrix comprises a plurality of elements and wherein each element of the matrix corresponds to a potential transition between two of the product machine states.

13. The method of claim 12, wherein the step of determining a matrix from the evaluation and synthesizer models further comprises the steps of:
selecting an element of the matrix;
assigning a probability to the element if a product machine transition exists between two product machine states corresponding to a potential transition that corresponds to the element, else assigning a zero to the element; and
continuing the steps of selecting and assigning until each element of the matrix has been assigned.

14. A method comprising the steps of:
a) creating an evaluation model from a plurality of evaluation phones, each of the phones corresponding to a first word;
b) creating a synthesizer model from a plurality of synthesizer phones, each of the phones corresponding to a second word;
c) creating a product machine from the evaluation model and synthesizer model, the product machine comprising a plurality of transitions and a plurality of states;
d) determining a matrix from the product machine; and
e) determining acoustic confusability of the first word and the second word by using the matrix, said matrix configured for speech recognition.

15. The method of claim 14, wherein each of the evaluation and synthesizer models comprises a hidden Markov model.

16. The method of claim 15, further comprising the step of determining synthetic likelihoods for each of the plurality of product machine states.

17. The method of claim 16, wherein each synthetic likelihood is a measure of the acoustic confusability of two specific observation densities associated with the hidden Markov models of the evaluation and synthesizer models.

18. The method of claim 16, wherein the synthetic likelihoods are compressed by normalization.

19. The method of claim 16, wherein the synthetic likelihoods are compressed by ranking.

20. The method of claim 16, wherein all synthetic likelihoods are determined through a method selected from the group consisting essentially of a cross-entropy measure, a dominance measure, a decoder measure, and an empirical measure.

21. The method of claim 14, further comprising the steps of:
f) performing steps (a) through (e) for a plurality of word pairs, each word pair comprising evaluation and synthesizer models, thereby determining a plurality of acoustic confusability; and
g) determining acoustic perplexity by using the plurality of acoustic confusabilities.

22. The method of claim 14 further comprising the steps of:
f) performing steps (a) through (c) for a plurality of word pairs, each word pair comprising evaluation and synthesizer models, thereby determining a plurality of acoustic confusability; and
g) determining synthetic acoustic word error rate by using the plurality of acoustic confusabilities.

23. A method comprising the steps of:
a) determining acoustic confusability for each of a plurality of word pairs, wherein step (a) further comprises the steps of, for each of the word pairs:
determining an edit distance between each word of the word pair; and
determining acoustic confusability from the edit distance; and
b) determining a metric for use in speech recognition by using the acoustic confusabilities, wherein step (b) further comprises the step of determining an acoustic perplexity by using the confusabilities.

24. The method of claim 23, further comprising the steps of:
c) performing steps (a) and (b) to determine an acoustic perplexity of a base bigram language model;
d) performing steps (a) and (b) to determine an acoustic perplexity of an augmented language model; and
e) determining gain comprising a logarithm of a fraction determined by dividing the acoustic perplexity of the augmented language model by the acoustic perplexity of the base bigram language model.

25. The method of claim 23, further comprising the step of:
c) minimizing acoustic perplexity during training of a language model.

26. The method of claim 25, wherein step (c) further comprises the step of maximizing a negative logarithm of the acoustic perplexity.

27. The method of claim 23, wherein step (b) further comprises the step of determining a Synthetic Acoustic Word Error Rate (SAWER) by using the confusabilities.

28. The method of claim 27, further comprising the steps of:
c) performing steps (a) and (b) to determine a SAWER of a base bigram language model;
d) performing steps (a) and (b) to determine a SAWER of an augmented language model; and
e) determining an improvement comprising a difference between the SAWER of the augmented language model and the SAWER of the base bigram language model.

29. The method of claim 27, further comprising the step of:
c) minimizing the SAWER during training of a language model.

30. The method of claim 29, wherein step (c) thither comprises the step of maximizing one minus the SAWER.

31. The method of claim 27, further comprising the steps of:
c) performing steps (a) and (b) to determine a SAWER for a vocabulary;
d) augmenting the vocabulary with at least one additional word;
e) performing steps (a) and (b) to determine a SAWER for the augmented vocabulary; and
f) determining an improvement comprising a difference between the SAWER for the vocabulary and the SAWER for the augmented vocabulary.

32. The method of claim 31, further comprising the steps of:
g) performing steps (d) through (f) for a plurality of additional words;
h) determining a particular word of the additional words that has a best improvement; and
i) adding the particular word to the vocabulary.

33. The method of claim 23, wherein each of the words of the word pairs is represented by a hidden Markov model, and wherein step (a) further comprises the steps of:
creating a product machine for each of the plurality of word pairs, wherein each word each product machine comprising a plurality of states and a plurality of transitions determined by the hidden Markov models of a corresponding word pair; and
for each product machine, determining synthetic likelihoods for each of the plurality of product machine states.

34. The method of claim 33, wherein each synthetic likelihood is a measure of the acoustic confusability of two specific observation densities associated with the hidden Markov models of the corresponding word pair.

35. The method of claim 33, wherein the synthetic likelihoods are compressed by normalization.

36. The method of claim 33, wherein the synthetic likelihoods are compressed by ranking.

37. The method of claim 33, wherein all synthetic likelihoods are determined through a method selected from the group consisting essentially of a cross-entropy measure, a dominance measure, a decoder measure, and an empirical measure.

38. The method of claim 33:
wherein step (a) further comprises the step of, for each acoustic confusability:
determining a matrix from a corresponding product machine; and
determining an inverse of a second matrix created by subtracting the matrix from an identity matrix; and
wherein each hidden Markov model comprises a plurality of phones;
wherein a larger word and a smaller word have an identical sequence of phones;
wherein the larger of the two words comprises an additional set of phones; and
wherein a set of calculations per formed when determining the inverse of the matrix for the smaller word is cached and used again when determining the inverse of the matrix for the larger word.

39. The method of claim 23, wherein the edit distance is determined by determining a number of operations and a type of each operation to change one word of the word pair into the other word of the word pair.

40. The method of claim 39, wherein the operations are selected from the group consisting essentially of deletions, substitutions and additions of phones.

41. The method of claim 39, further comprising the step of weighting each operation.

42. The method of claim 39, further comprising the step of assigning a cost to each operation.

43. A method for determining acoustic confusability of a word pair, the method comprising the steps of:
determining an edit distance between each word pair and an associated alignment;
assigning acoustic distances to each aligned phoneme pair; and
determining an acoustic confusability for use in speech recognition by summing said acoustic distances.

44. The method of claim 43, wherein the edit distance is determined by determining a number of operations and a type of each operation to change one word of the word pair into a second word of the word pair.

45. The method of claim 44, wherein the operations are selected from the group consisting essentially of deletions, substitutions and additions of phones.

46. The method of claim 44, further comprising the step of weighting each operation.

47. The method of claim 44, further comprising the step of assigning a cost to each operation.

48. An apparatus comprising:
a memory that stores computer-readable code; and
a processor operatively coupled to said memory, said processor configured to implement said computer-readable code, said computer-readable code configured to:
create an evaluation model from at least one evaluation phone;
create a synthesizer model from at least one synthesizer phone;
determine a matrix from the evaluation and synthesizer models;
create a new matrix by subtracting the matrix from an identity matrix determine an inverse of the new matrix; and
determine acoustic confusability by using the inverse of the new matrix.

49. An apparatus comprising:
a memory that stores computer-readable code; and
a processor operatively coupled to said memory, said processor configured to implement said computer-readable code, said computer-readable code configured to:
a) determine acoustic confusability for each of a plurality of word pairs, wherein step (a) further comprises the steps of for each of the word pairs:
determining an edit distance between each word of the word pair; and
determining acoustic confusability from the edit distance; and
b) determine a metric for use in speech recognition by using the acoustic confusabilities, wherein step (b) further comprises the step of determining an acoustic perplexity by using the confusabilities.

50. The apparatus of claim 49, wherein the computer-readable code is further configured, when performing step (b), to determine a Synthetic Acoustic Word Error Rate (SAWER) by using the confusabilities.

51. An apparatus for determining acoustic confusability of a word pair, the system comprising:
a memory that stores computer-readable code; and
a processor operatively coupled to said memory, said processor configured to implement said computer-readable code, said computer-readable code configured to:
determine an edit distance between each word pair and an associated alignment;
assign acoustic distances to each aligned phoneme pair; and
determine an acoustic confusability for use in speech recognition by summing said acoustic distances.

52. An article of manufacture comprising:
a computer-readable medium having computer-readable code means embodied thereon, the computer-readable program code means comprising:
a step to creating an evaluation model from at least one evaluation phone;
a step to creating a synthesizer model from at least one synthesizer phone;
a step to determining a matrix from the evaluation and synthesizer models;
a step to create a new matrix by subtracting the matrix from an identity matrix
a step to determine an inverse of the new matrix; and
a step to determine acoustic confusability by using the inverse of the new matrix.

53. An article of manufacture comprising:
a computer-readable medium having computer-readable code means embodied thereon, the computer-readable program code means comprising:
a) a step to determine acoustic confusability for each of a plurality of word pairs, wherein step (a) further comprises the steps of, for each of the word pairs:
determining an edit distance between each word of the word pair; and
determining acoustic confusability from the edit distance; and
b) a step to determine a metric for use in speech recognition by using the acoustic confusabilities, wherein step (b) further comprises the step of determining an acoustic perplexity by using the confusabilities.

54. The article of manufacture of claim 53, wherein the computer-readable program code means further comprises, when performing step (b), a step to determine a Synthetic Acoustic Word Rate (SAWER) by using the confusabilities.

55. An article of manufacture for determining acoustic confusability of a word pair, the article of manufacture comprising:
a computer-readable medium having computer-readable code means embodied thereon, the computer-readable program code means comprising:
determine an edit distance between each word pair and an associated alignment;
assign acoustic distances to each aligned phoneme pair; and
determine an acoustic confusability for use in speech recognition by summing said acoustic distances.

* * * * *